(12) United States Patent
Benninghoff

(10) Patent No.: US 11,131,435 B2
(45) Date of Patent: Sep. 28, 2021

(54) APPARATUS AND METHODS OF IMPROVEMENT OF SOLAR LIGHT FIXTURES

(71) Applicant: Karen Benninghoff, Chicago, IL (US)

(72) Inventor: Karen Benninghoff, Chicago, IL (US)

(*) Notice: Subject to any disclaimer, the term of this patent is extended or adjusted under 35 U.S.C. 154(b) by 0 days.

(21) Appl. No.: 16/289,326

(22) Filed: Feb. 28, 2019

(65) Prior Publication Data

US 2019/0316746 A1    Oct. 17, 2019

Related U.S. Application Data

(60) Provisional application No. 62/637,711, filed on Mar. 2, 2018.

(51) Int. Cl.
| | |
|---|---|
| *F21S 9/03* | (2006.01) |
| *H02S 40/38* | (2014.01) |
| *F21S 8/00* | (2006.01) |
| *F21L 19/00* | (2006.01) |

(52) U.S. Cl.
CPC ............. *F21S 9/035* (2013.01); *F21S 8/033* (2013.01); *H02S 40/38* (2014.12); *F21L 19/00* (2013.01)

(58) Field of Classification Search
CPC .. F21S 9/035; F21S 8/033; F21S 8/065; F21L 19/00; F21V 19/0055; F21V 19/04; F21V 19/06; H02S 40/38; Y02E 10/50; Y02E 70/30
See application file for complete search history.

(56) References Cited

U.S. PATENT DOCUMENTS

| | | | | | |
|---|---|---|---|---|---|
| 3,621,234 | A | * | 11/1971 | Fremont | F21S 6/001 439/542 |
| 4,590,545 | A | * | 5/1986 | Scheer | F21S 6/001 362/392 |
| 4,998,193 | A | * | 3/1991 | Chuing-Hui | F21S 6/007 362/353 |
| 5,951,153 | A | * | 9/1999 | Favela | F21S 6/007 362/414 |
| 6,039,463 | A | * | 3/2000 | Lin | F21S 6/002 362/410 |
| 6,565,240 | B1 | * | 5/2003 | Wu | F21S 8/065 362/249.01 |
| 7,837,509 | B1 | * | 11/2010 | Switzer | H01R 33/22 439/642 |
| 8,002,427 | B2 | * | 8/2011 | Lavigne | F21S 6/001 362/153.1 |
| 8,057,078 | B1 | * | 11/2011 | Ko | G09F 17/00 362/431 |
| 2006/0227562 | A1 | * | 10/2006 | Mast | F21V 27/00 362/392 |
| 2008/0315056 | A1 | * | 12/2008 | Hsu | F21S 8/065 248/324 |
| 2013/0107546 | A1 | * | 5/2013 | Peter | F21S 8/065 362/368 |

(Continued)

*Primary Examiner* — Zheng Song
(74) *Attorney, Agent, or Firm* — Vedder Price P.C.

(57) ABSTRACT

This disclosure relates to an improvement in lighting fixtures, and particularly to chandeliers, candelabras, wall sconces, post lamps, lanterns and candle ware and is equally applicable to lighting fixtures manufactured to illuminate utilizing energy sources such as electricity, candle, kerosene, fuel or gas. A system and method are disclosed to convert conventional light fixtures to solar light fixtures using a rod tube.

9 Claims, 32 Drawing Sheets

(56) References Cited

U.S. PATENT DOCUMENTS

| | | | |
|---|---|---|---|
| 2014/0063837 A1* | 3/2014 | Rowlette, Jr. | G02B 6/0008 362/555 |
| 2015/0377461 A1* | 12/2015 | Hutchins | F21V 21/03 362/237 |
| 2019/0211983 A1* | 7/2019 | Shine | F21S 2/005 |

* cited by examiner

APPARATUS AND METHODS OF IMPROVEMENT OF SOLAR LIGHT FIXTURES

CROSS-REFERENCE TO RELATED APPLICATION

This application claims the benefit of U.S. Provisional Application No. 62/637,711, filed Mar. 2, 2018, which is incorporated by reference herein.

FIELD OF THE DISCLOSURE

This invention relates to an improvement in lighting fixtures, and particularly to chandeliers, candelabras, wall sconces, post lamps, lanterns and candle ware and is equally applicable to lighting fixtures manufactured to illuminate utilizing energy sources such as electricity, candle, kerosene, fuel or gas.

BACKGROUND OF THE INVENTION

Conventional lighting requires an electric, fuel, candle or gas source. In the case of kerosene or fuel and candle lighting fixtures, fuel or wax and its replacement is required, as is the need to manually ignite and extinguish to turn light on and off. Fuel-driven lighting fixtures exude substantial heat which may not be ideal for certain locations. In addition, care must be taken so as not to impose a fire hazard.

Electric lighting fixtures require wiring to an electrical power source, timer, photosensor or the need to manually turn on and off. Gas driven lighting fixtures require a gas source, piping to the fixture and, by nature of that traditional arrangement, are usually in the on or lit position constantly burning. All of the above mentioned sources represent continual recurring costs by way of replacement of fuel, candles, electrical kilowatts or gas therms used, plus corresponding delivery charges and tax.

For the above reasons, solar light fixtures are an eco-friendly, automatic, nonutility-consuming alternative to outdoor lighting needs. Conventional solar light fixtures currently available on the market have been found to be unreliable in their ability to withstand all outdoor climates and extreme wind and weather conditions. By nature of their design and current technology, their lifetime lighting longevity is limited. Current solar outdoor lighting fixtures are constructed such that when the solar light components fail, the entire fixture is rendered useless, primarily destined to landfill.

BRIEF SUMMARY OF THE INVENTION

This invention converts or constructs with improvements, a lighting fixture typically requiring electric, fuel, candle or gas to a high quality solar powered lighting fixture made to withstand extreme weather conditions in all climates while providing carefree, reliable, eco-friendly, cost-effective lighting for years to come. This invention is especially conducive for areas exposed to extreme temperatures, precipitation and wind and may be used outdoors virtually anywhere worldwide.

This invention provides for a secure yet accessible fit of independent solar light bulbs to solar light fixture and the ability to replace each independent solar light bulb and/or its battery individually. It is anticipated that significant improvements to solar light bulbs and rechargeable batteries will be made in the future. As each solar light bulb is independent of the lighting fixture, the solar light bulb and its batteries may be replaced or upgraded at any time while retaining the solar light fixture. This invention, by virtue of its solar light bulb, does not throw off any heat or require outside fuel or utility sources. The independent solar light bulb reliably charges in ambient daylight and its sensors activate light each night.

For purposes of example, this invention illustrated and described utilizing currently manufactured lighting fixtures known as chandeliers, candelabras, wall sconces and candle ware and the utilization of solar lights currently available on the retail market. This invention encompasses the described improvement to invention and improvement characteristics and methodology of which any or all may be applied, as appropriate, to any electric, candle, kerosene, fuel or gas light fixture for like results.

For purposes of this invention, either size solar light referenced may be used as appropriate to similarly sized solar light fixtures and is not meant to be limited to these particular brands or models. An improvement to invention is that the battery housing for both Petite and Large solar lights referenced remain uniformly sized for its corresponding rechargeable battery and be utilized to establish two universal standard sizes. These solar lights may now be known as Large and Petite Solar Light Bulbs for use in solar light fixtures. An improvement to invention is to modify the clear glass lens of the two standard sized solar light bulbs to more closely resemble soft candle flame or flower bud, a combination of both, or some other design pleasing for use in solar light fixtures.

The present invention relates to an improvement to lighting fixtures whereby appropriate drainage/air holes are incorporated in the light fixture at its lowest levels when upright, ensuring water does not accumulate in the light fixture and around the solar light bulb battery housing. The drain holes and placement in said invention eliminates that issue. Metal has a tendency to produce condensation in humid conditions and the lighting fixtures, by virtue of being outdoors, will be subject to precipitation in the form of rain, snow and sleet.

The present invention by incorporating appropriate drainage in the lighting fixture as my invention describes, moisture accumulation will be nominal, thereby preventing/deterring rust and eliminating ice expansion damage. In addition, drain holes added to the lighting fixture also serve as air holes providing air movement within the lighting fixture further encouraging evaporation of any moisture.

The present invention provides an improvement to a light fixture rendering the fixture agreeable to accept an independent solar light bulb for a secure yet removable fit. An improvement to invention is the addition of a fixed upright tube or rod of appropriate height and width for secure insertion of battery housing for solar light bulb and alternatives for securing same while ensuring appropriate drainage incorporated as fully assembled.

In an improvement to invention includes methods of further securing the solar light bulb as inserted into an upright tube or rod by utilizing a screw fastener. An improvement to invention is the method of attachment of the candle cup and/or bobeche to the solar light fixture arm. An alternative improvement to invention is the modification of the solar light bulb battery housing or solar housing with the addition of screw threads corresponding to screw threads of the solar light fixture.

In an improvement to invention is to utilize, with the invention improvements, lighting fixtures and their interchangeable components currently manufactured, thereby reducing production costs. In the case of light fixtures traditionally wired for electric, better drainage and air flow are achieved within the solar light fixture by eliminating or excluding all wiring and electrical components and is an improvement to invention. Another improvement to invention is the minor costs to incorporate invention improvements, which in production will be more than offset by the elimination or exclusion of the electric, fuel or gas components no longer needed.

An improvement to invention is the secure fastening or affixation of the top cap screw to all hanging and chandelier type solar light fixtures traditionally assembled with center rods. To further ensure that the top cap screw holding the solar light fixture assembly does not unscrew, the addition of a swivel shackle between the top cap screw and hanging chain or cable is an improvement to invention. In high winds, suspended solar light fixtures will have a tendency to rotate slightly. The swivel shackle allows the rotation of the solar light fixture through its hardware eliminating the wind driven rotation unscrewing the top cap screw. This improvement is unnecessary if the solar light fixture is comprised of a molded frame. An improvement to invention is the addition of a top screw or cover to the top center of a traditional fixture loop acting as a precipitation and debris shield.

An optional addition of a splash guard over the candle cup provides precipitation and debris deflection deterring the accumulation of leaves and outdoor debris, which may interfere with open drain holes, is shown as an improvement to invention. While not vital, it is suggested that the protection it affords certain solar light fixtures outweighs the minor costs associated with producing same.

Another object of the invention is to ensure maximum preservation of the solar light fixture as exposed to outdoor elements by ensuring an exterior finish is applied to all metal parts of the solar light fixture and, if appropriate, to the independent solar light bulb housing.

An improvement to invention is to suggest the NiCd (nickel cadmium) rechargeable battery currently provided with the solar light be replaced with the environmentally friendly NiMh (Nickel Metal Hydride) battery. While current NiCd batteries have a life of approximately 500 hours, or one and a half years of daily use, NiMh batteries not only deliver more power lasting longer in high drainage devices, but can be charged up to 1,000 times, providing three to four years of daily use. NiMH batteries are free of toxic or hazardous elements such as cadmium, lead, mercury or lithium and can be disposed of safely. It is anticipated improvements will be made to rechargeable batteries in the future. An improvement to invention is to allow for such future upgrades. An improvement to invention is that components comprising the solar light bulb be recyclable.

DETAILED DESCRIPTION OF THE INVENTION

Figure 1:
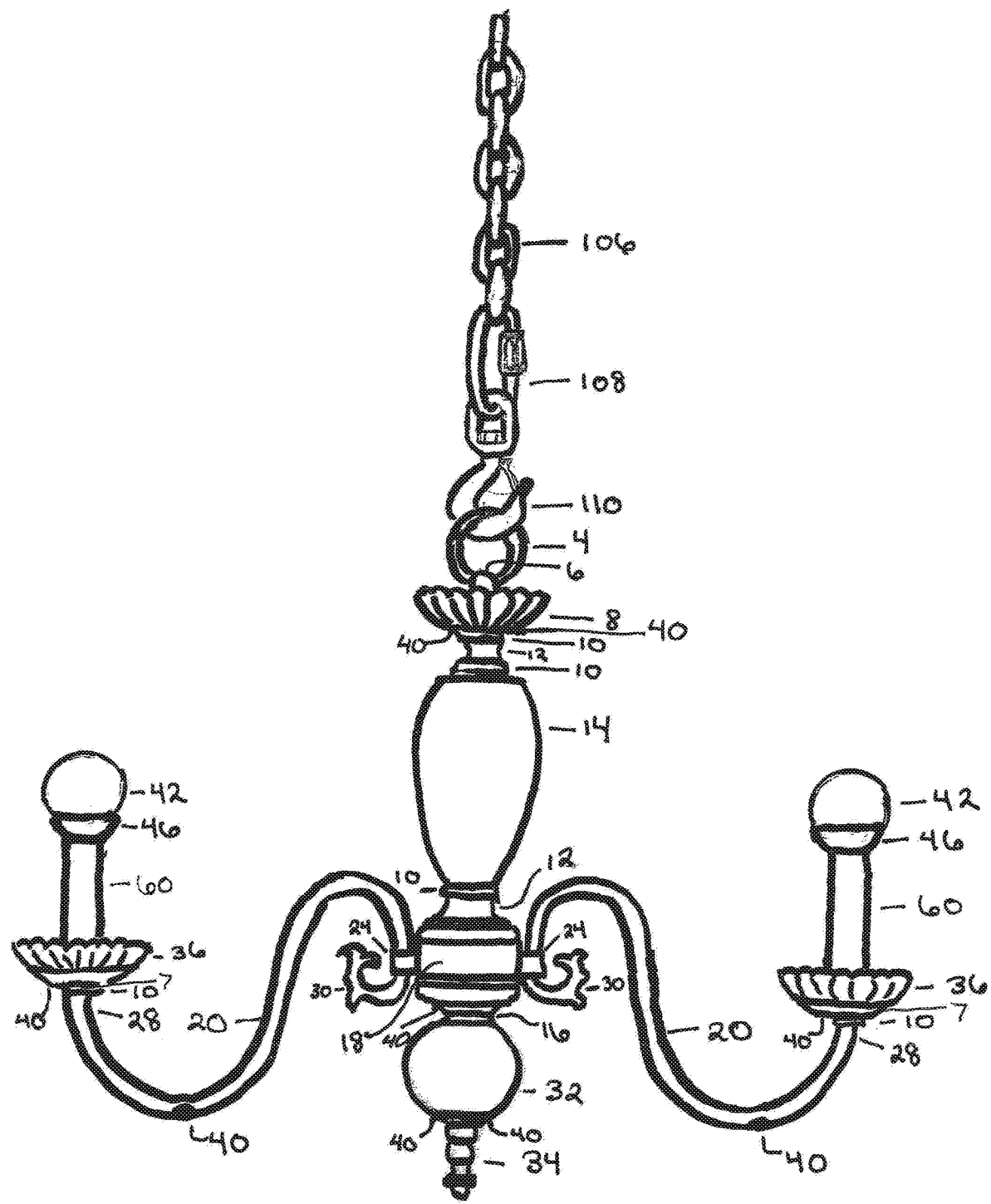
FIG. 1 is a front elevational view illustrating a solar light fixture constructed in accordance with the principles of the invention.

For purposes of example, this invention illustrated and described utilizing lighting fixtures known as chandeliers, candelabras, wall sconces and candle ware currently manufactured and available on the open market. This invention encompasses the described improvement to invention and improvement characteristic and methodology of which any or all may be applied, as appropriate, to any electric, candle, fuel or gas lighting fixtures for like results.

Turning now to the drawings, which describe the presently preferred embodiments of the invention for the purpose of illustrating the practice thereof, and not by way of limitation of the scope of the invention, and in which like reference characters refer to corresponding elements through the views referenced.

FIG. 1 comprises the invention in its assembled and ready to use state illustrating a traditional chandelier and commonly used components of same, some of which have been improved upon in this invention. Components and parts are considered to be as traditionally or currently manufactured or made with their utilitarian design and commonly known identifying name incorporated therein. Improvements to invention described and illustrated may be applied to any chandelier including those illuminated with gas, fuel or candle, and apply to those with any number of arms 20 with improvements made to each. As chandelier and thusly solar light fixture assembled from top downwards, FIG. 1 described as such in order of assembly. Components comprising the suspension mechanism for solar light fixture illustrated are chain 106 with swivel snap hook 110 attached via quick link 108 and further described in FIGS. 14-15. Solar light fixture components illustrated described as: body 2 of a center core comprised of hollow wiring rod or nipple 80, generally found to be standard ⅛-IP, ⅛F×⅛F, to which components are assembled and attached and further detailed in FIGS. 2 and 3. Fixture hanger loop 4 screws onto top of nipple 80 and used as base for assembly of certain components. To the top of fixture hanger loop 4, plug or top screw 6 added and further detailed in FIG. 13. Crown bobeche 8, currently found to be universally manufactured with center open hole 7, is inserted over nipple 80 followed by check ring 10; reducer neck 12; check ring 10; column 14; reducer neck 12; arm body 18; break neck 16; ball fount 32 and secured with screw-on attachment of finial 34 to lowest end nipple 80. Arms 20 attached to arm body 18 with arm back 24. To arm 20, scroll 30 incorporated into molded design for decorative purposes. Bobeche 36, known as a collar or cupped ring to catch drippings on a candlestick or on chandelier to hold suspended glass prisms universally manufactured with center open hole 7, attached to outer arm 28 of arm 20 over arm nipple 22 between check ring 10 and socket nut 56 and method of which is an improvement to invention further described in FIGS. 3, 4, 6, 8-9, 25-26. Rod tube 60, an improvement to invention, further described in FIGS. 3-11, 16-30, affixed to top center of bobeche 36, currently found to be universally manufactured with center open hole 7. Solar light bulb 42 inserted into rod tube 60, its solar housing 46 abutting upper rim of rod tube 60. Drain holes 40, an improvement to invention, added at lowest level of crown bobeche 8, lower break neck 16, ball fount 32, arm 20 and bobeche 36, further detailed in FIGS. 3-30.

The addition of drain holes 40 eliminates the accumulation of moisture and its resulting damage adding to the longevity of solar light fixture. An improvement to invention is to ensure drain holes 40 are incorporated into certain components of solar light fixture. Methods of incorporating drain holes 40 into solar light fixture components include drill press, punch, mold, or variations thereof, in pre- or post-production. Drain holes 40 placed at lowest level of certain component wherein condensation may be prone to form, such as inside hollow components, or precipitation accumulate. Drain holes 40 may be presented at a standard width of approximately ⅛" or thereabouts, and may range in size from 1/16" to ¼" dependent upon size of component as conducive to optimal drainage and airflow without compromising integrity of individual component.

Figure 2:
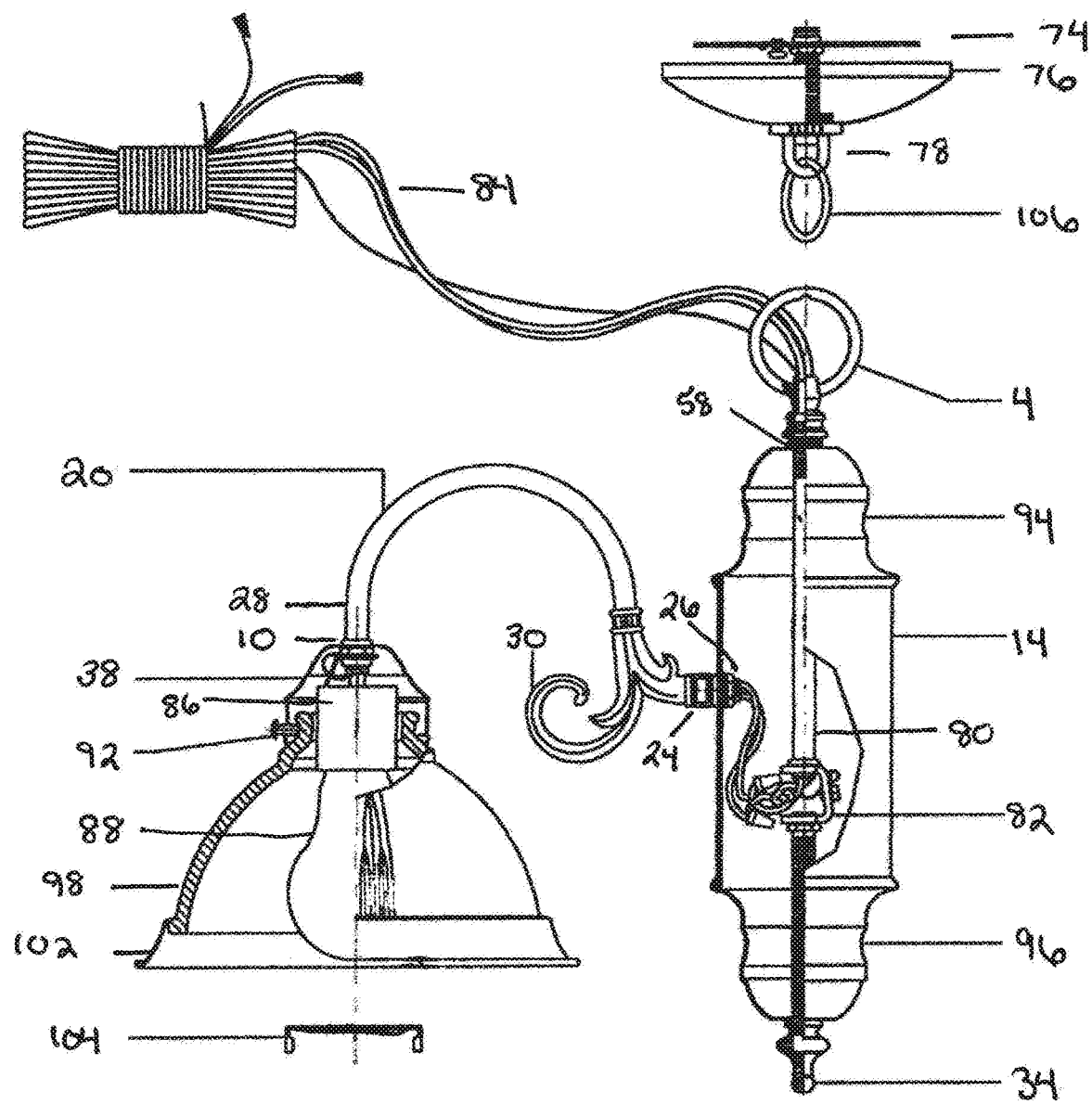
FIG. 2 is front elevational sectional view of certain traditional components, some of which are eliminated in the solar light fixture of FIGS. 1, 3, 16-19.
Figure 3:
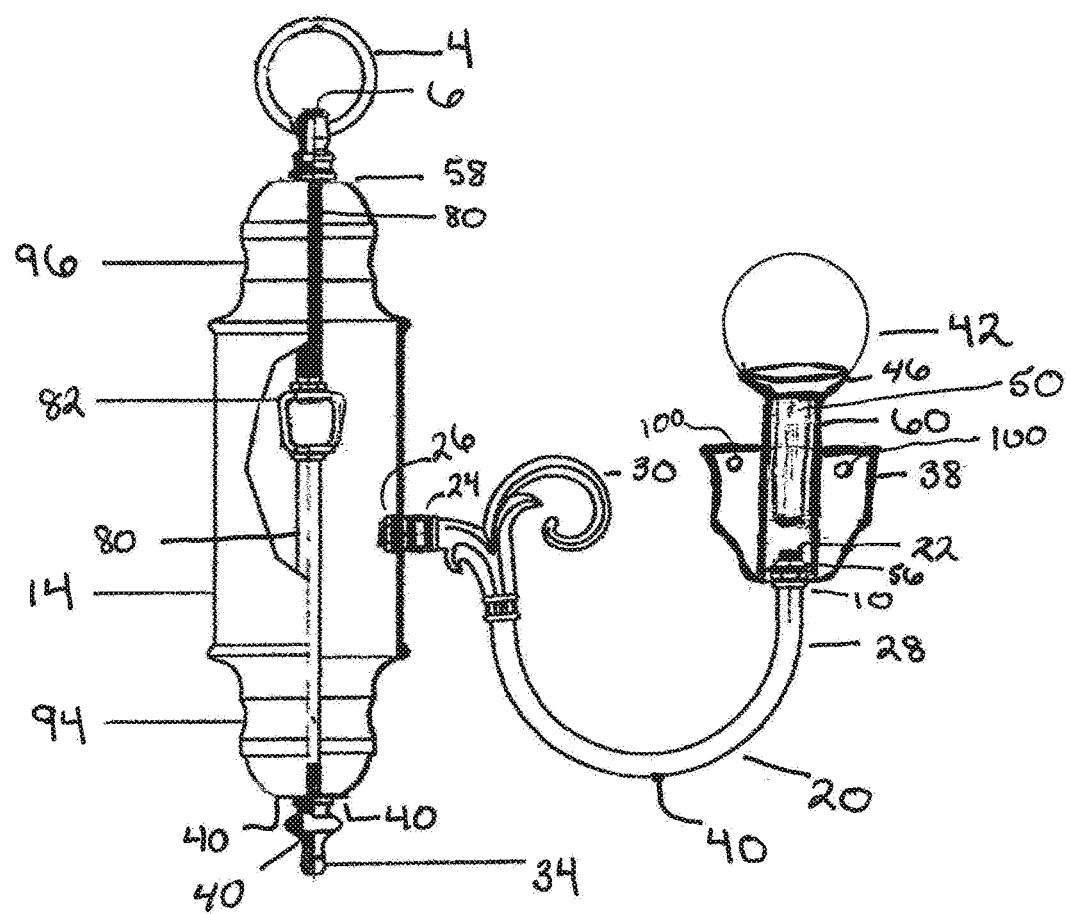
FIG. 3 is a front elevational sectional view of a solar light fixture constructed in accordance with the principles of the invention of FIG. 1, elimination of certain components described in FIG. 2, and further described in FIGS. 4-30.

FIG. 2 illustrates commonly manufactured electric chandelier in its wired, ready to use state, provided for clarity and as a comparison to improvements to invention of conversion of electric chandelier to solar light fixture shown in FIG. 3. It is anticipated currently manufactured electric, fuel and gas chandeliers and their parts may be adapted and utilized, with certain components removed or eliminated from production. It is found chandelier parts are generally interchangeable as many parts are of a standard measurement. The electric chandelier components illustrated described from the top down as: cross bar 74 attached to an electric source in the ceiling. To this, canopy 76 with canopy loop 78 and chain 106 is attached for suspension of chandelier. Body 2 is comprised of fixture hanger loop 4 and lock washer 58, which may be helpful in inhibiting rotation of fixture hanger loop 4, as screwed onto nipple 80 onto which remaining components are assembled. Top cup 94 is inserted followed by column 14; bottom cup 96; and held firmly with finial 34. Arm 20 with scroll 30 attached to column 14 by screwing arm back 24 into column 14 and securely fastening with arm back nut 26. Generally, chandelier arm 20 manufactured with hollow arms 20 and hollow arm nipple 22, usually found to be ⅛-IP, ⅛F×⅛F, molded to outer arm 28 to allow passage of electrical wire 84, or gas or fuel, and attachment of certain components, utilizing standard sizes as determined previously, the design of which are fully incorporated for purposes of this invention. Check ring 10 molded to outer arm 28. Candle cup 38, currently found to be universally manufactured with center open hole 7, inserted over arm nipple 22 onto outer arm 28 to check ring 10. Electrical wire 84, attached to electrical socket 86, threaded into arm 20 through arm nipple 22 to arm back 24. Electrical socket 86, generally produced as standard (aka Edison) or candelabra size, known to contain screw threads for fastening to arm nipple 22 of arm 20, thereby holding candle cup 38 securely to arm 20. Threaded ring 104 may be utilized under electrical socket 86 to attach lampshade finial. Electric light bulb 88 inserted into electrical socket 86. Glass sconce 98 with decorative ring 102 attached to sides of candle cup 38 with thumb screws 100. Electrical wire 84 is threaded through fixture hanger loop 4 and contained within nipple 80. Hickey 82 used as spacer or gap in nipple 80 for space to join electrical wire 84 from nipple 80 to individual arm 20. Electrical wire 84 would be snaked through chain 106, into canopy 76 and connected to ceiling electrical source.

FIG. 3 illustrates the chandelier of FIG. 2 as adapted or converted to solar light fixture utilizing improvements to invention. Electrical wire 84 is eliminated entirely. It is noted arm 20 of electric chandelier of FIG. 2 is attached to column 14 in downward position. As gravity holds solar light bulb 42 in rod tube 60, and solar light bulb 42 will absorb more energy in an upright position towards the sun, arms 20 should be in an upward position as further described in FIGS. 4-12, 16-27. Arms 20 may be easily repositioned upwards in relation to the body 2 and secured with arm back nut 26 to column 14. Conversely, an improvement to invention is to switch or flip the positions of fixture hanger loop 4 and finial 34 in relation to body 2 components, as illustrated here. As arm 20 of chandelier in FIG. 2 positioned in upper third of column 14, it was determined that rotating arms 20 upwards would adversely affect the style of the completed solar light fixture. It was determined a more pleasing overall design for this solar light fixture would be achieved by switching the position or placement of fixture hanger loop 4 with finial 34 whereby column 14 with attached arm 20 is essentially flipped 180° resulting in arms 20 being positioned upright in the lower third of column 14.

Solar light fixture components illustrated are described from the top downwards as: Body 2 comprised of fixture hanger loop 4 with plug or top screw 6, detailed in FIG. 13, securely affixed to nipple 80 onto which remaining components are assembled. As all electrical wire 84 is eliminated, hickey 82 attached to nipple 80 may be utilized as part of the length of nipple 80. Alternatively, nipple 80 with hickey 82 may be replaced with one single nipple 80 of appropriate length, eliminating hickey 82.

Here top cup 94 and bottom cup 96 are identical. If of different design, top cup 94 may be switched with bottom cup 96 and inserted onto nipple 80 followed by column 14, top cup 94 and held firmly with finial 34. Arm 20 with scroll 30, now in the upright position, attached to column 14 by screwing arm back 24 into column 14 and securely fastening with arm back nut 26.

Electrical socket 86 of FIG. 2, attached in the center of candle cup 38, fastened with its screw bottom and/or threaded ring 104, is eliminated, as is electric light bulb 88. It is found arm 20 of both vintage and currently produced electric chandeliers of FIGS. 1 and 2 usually contain molded arm nipple 22 at both outer arm 28 and arm back 24, the design of which is incorporated fully for purposes of this invention. With the elimination of electrical socket 86, an alternative method of attaching candle cup 38 with its center open hole 7 onto outer arm 28 is required. This may be achieved with addition of socket nut 56, of an appropriate size to screw onto arm nipple 22 of outer arm 28, and is an improvement to invention. Center open hole 7 of candle cup 38 inserted over and on top of outer arm 28 onto check ring 10 and arm nipple 22 as molded onto outer arm 28 of arm 20. Socket nut 56 is placed in lower center of candle cup 38 and fastened to arm nipple 22 of outer arm 28 holding candle cup 38 securely to arm 20. An optional lock washer 58 may be used under socket nut 56 if determined to provide a more secure fastening of candle cup 38 to outer arm 28. If threaded ring 104 of FIG. 2 is found to be an appropriate fastener of candle cup 38 to arm nipple 22, threaded ring 104 may be used in place of socket nut 56 and optional lock washer 58.

Rod tube 60 affixed into the center inside well of candle cup 38 surrounding socket nut 56 and optional lock washer 58, various methods of which further detailed in FIGS. 4-12. Battery housing 50 of solar light bulb 42 inserted vertically into rod tube 60, its solar housing 46 resting on upper rim of rod tube 60. This method allows for secure yet removable fit of solar light bulb 42 to solar light fixture.

Glass sconce 98 with decorative ring 102 attached with thumb screws 100 to sides of candle cup 38 as shown in FIG. 2 eliminated. It is found glass sconce 98, usually comprised of frosted glass and of a size commonly produced with this particular type of chandelier, not only interferes with the light radiance emitted by solar light bulb 42 and its ability to receive direct sunlight, but acts as a receptacle for outdoor debris in the form of leaves and precipitation, further blocking the illumination of solar light bulb 42. Stylistically it is found glass sconce 98 and decorative ring 102 are not necessary components to the overall pleasing style of solar light fixture and suggest elimination of same.

Candle cup 38 of chandelier in FIG. 2 will contain thumb screw 100 holes for attachment of eliminated glass sconce 98. Thumb screw 100 holes may be plugged with thumb screw 100. Alternatively, thumb screw 100 may be eliminated and replaced with adornments such as a pearl head of corsage pin, small crystal bead, fishing weight or shot, trim or any such adornment as appropriate to style of solar light fixture in its completed state. Candle cup 38 may be newly produced whereby thumb screw 100 holes eliminated in production.

Drain holes 40, an improvement to invention, added at lowest levels of candle cup 38 when upright surrounding outer rod tube 60 and at base between location of inner rod tube 60 and outside socket nut 56 when assembled; arm 20; top cup 94 (switched with bottom cup 96 with assembly in manner described above); and, if appropriate, finial 34 further detailed in FIGS. 1, 4-30.

Figure 4:
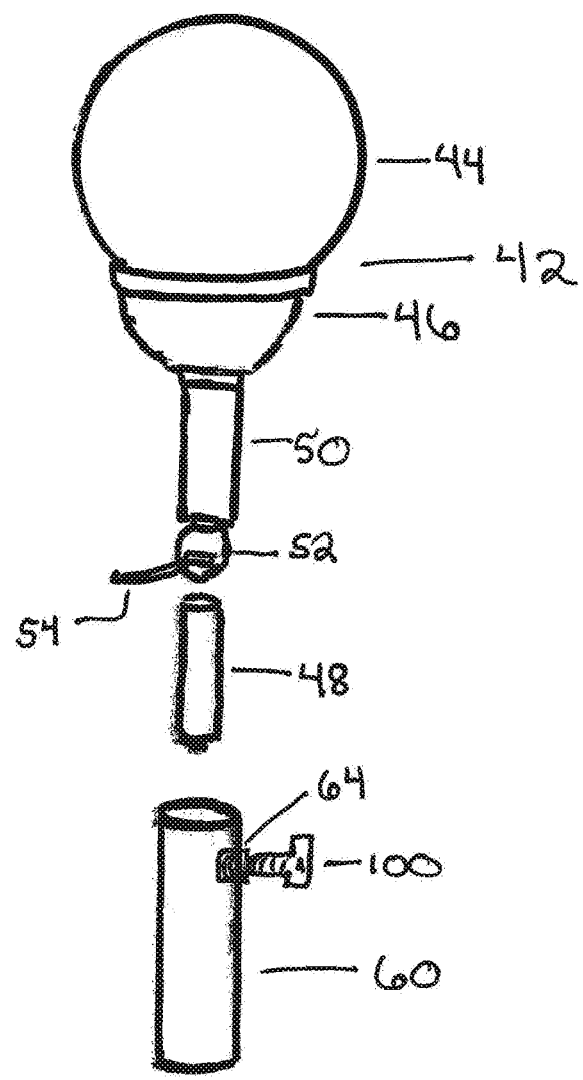
FIG. 4 is a front elevational side view illustrating component of invention of FIG. 1, improvements to which are further detailed in FIGS. 4-30.

FIG. 4 illustrates solar light bulb 42 utilized in solar light fixture comprised of one or more solar cells, aka amorphous solar panel, photo-resistor arranged to recharge the battery and power the LEDs, and light-emitting diode(s) or LED bulb facing upward contained on top of and within solar housing 46 encased within clear crackle ball glass lens 44 of approximately 2.36" diameter referenced as Petite; or 3.15" diameter referenced as Large. Rechargeable battery 48 inserted into battery housing 50, held in place by closing and fastening battery cover and screw 52 containing positive battery connection, attached to lowest end of battery housing 50. Pull tab 54 provides break of connection when placed between the rechargeable battery 48 and battery cover and screw 52, as included in purchase of new solar light bulb 42. Pull tab 54 removed prior to initial use. Solar housing 46 of Large solar light bulb 42 currently manufactured of dark bronze or silver metal. Solar housing 46 of Petite solar light bulb 42 currently manufactured of black hard plastic.

Solar light bulb 42 utilized in this invention currently manufactured and sold as outdoor garden path lights and contain hollow tube of materials and color matching solar housing 46 for insertion of and to hold battery housing 50 with removable plastic garden stake. Battery housing 50 is inserted vertically into hollow tube; garden stake inserted at opposite end of hollow tube and driven into ground. It is found Petite hollow tube generally comprised of hard plastic, predominantly black in color; Large hollow tube comprised of aluminum metal alloy, predominantly dark bronze or silver in color. It is found hollow tube currently provided with these type of solar light bulbs 42 may be used as rod tube 60 in solar light fixture with modification and is an improvement to invention.

Battery housing 50 sizes of solar light bulbs 42 referenced and currently manufactured are Petite: approximately 11/16"/ 17 mm diam.×1¾"/4.2 cm high to house AAA rechargeable battery 48; Large battery housing 50 approximately 13/16"/2.1 cm diam.×1¾"/4.2 cm high, to house AA rechargeable battery 48, both comprised of hard plastic, predominantly black in color. Petite hollow rod 18 mm inside diam./2 cm outside diam.×17 cm length; Large hollow rod 2.3 cm inside diam./2.4 cm outside diam.×18.5 cm length. An improvement to invention is to establish standard universal sizes of Large and Petite, generally referring to the overall dimension of battery housing 50 required to contain AA or AAA rechargeable battery 48 and size of clear crackle ball glass lens 44 of approximately 2.36" diameter referenced as Petite; and 3.15" diameter referenced as Large. Size of solar light bulb 42 used in solar light fixture determined based on size of solar light fixture. It is recommended Large solar light bulb 42 be utilized in most instances due to its more powerful illumination capabilities as provided by its larger AA rechargeable battery 48. It is noted, as currently manufactured, Large solar light bulb 42 weighs approximately 0.25 kg or 0.5 lbs. with rechargeable battery 48 and Petite solar light bulb 42 weighs 0.15 kg or 0.3 lb. with rechargeable battery 48. The weight of solar light bulb 42 should be factored into overall weight of solar light fixture for stability, shipping and hanging purposes.

Rod tube 60 may be comprised of the provided hollow rod, reduced in length appropriate to contain entire battery housing 50, plus a recommended ¼" at minimum. Recommended total length of rod tube 60 utilizing socket nut 56 for attachment of components to outer arm 28 is 2¼". The ½" additional length beyond battery housing 50 length of 1¾" provides ¼" space to offset height of socket nut 56 ensuring battery cover and screw 52 of battery housing 50 does not contact socket nut 56 when solar light bulb 42 inserted for use and allows ¼" space aiding drainage and providing air circulation. Although appropriate drainage is incorporated as further described in FIGS. 1, 3-30, the recommended 2¼" minimum length further ensures water will not accumulate around the battery housing 50 in the event solar light fixture is subjected to large amounts of fast precipitation. As water seeks its lowest level, any condensation or moisture will flow to a level below that of rechargeable battery 48 and battery housing 50 and through drain holes 40. While recommended minimum rod tube 60 length is 2¼", its maximum height should be in ratio to the overall look of solar light fixture as solar light bulb 42 is contained within. Rod tube 60 will generally be 2¼" to 3" in length/height as it is found that size range appropriate to ratio of most lighting fixtures manufactured, and may be of any height longer than 2" to correspond with style of solar light fixture.

Vertical side rod tube 60 may be fashioned with interior screw threads 64 matching thumb screw 100 to further secure battery housing 50 to rod tube 60, such as found in electrical set screw connector. Interior screw threads 64 should be located where thumb screw 100 may be accessed in fully assembled ready to use state. Thumb screw 100 may utilize wing nuts and/or be decorative in nature. This method provides removable fit of solar light bulb 42 to solar light fixture and secure fastening of battery housing 50 to rod tube 60, particularly useful in tabletop and portable solar light fixtures subject to frequent handling, an improvement to invention.

Figure 5:
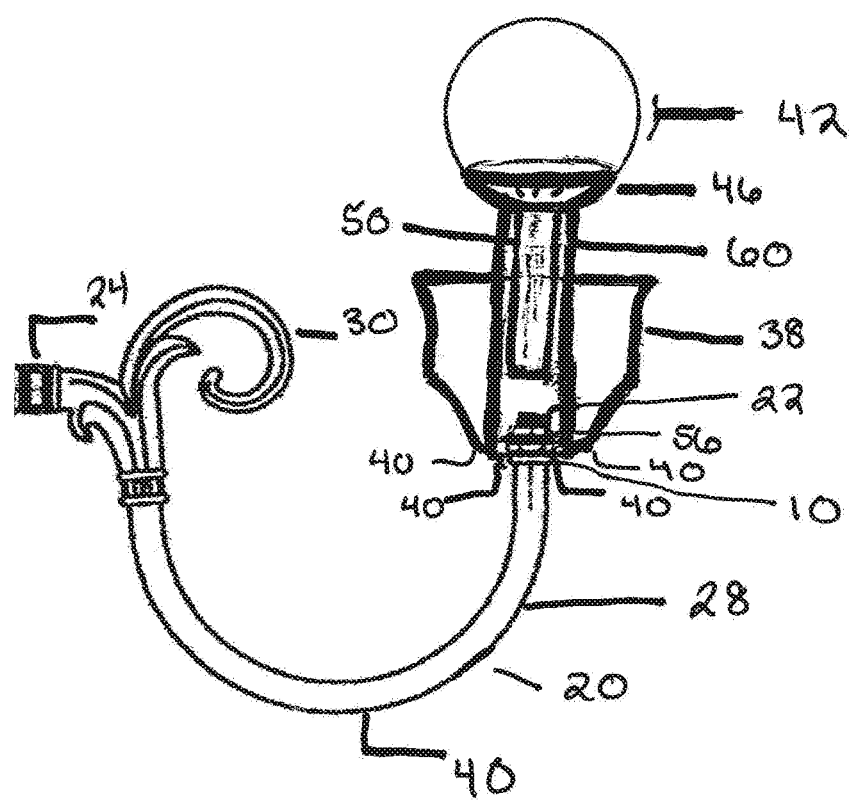
FIG. 5 is an exploded side sectional view of certain components of solar light fixture of FIGS. 1, 3, 16-19 illustrating improvements, sample method of said improvements and assembly of certain components.
Figure 6:
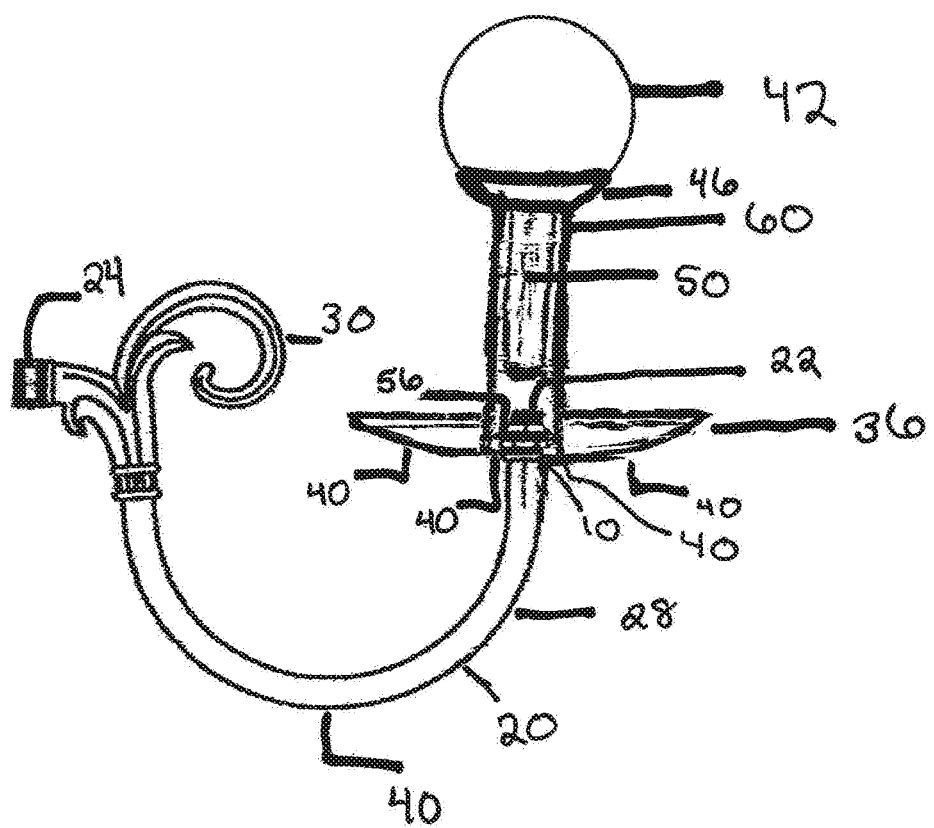
FIG. 6 is an exploded side sectional view of certain components of solar light fixture of FIGS. 1, 3, 16-19 illustrating improvements, sample method of said improvements and assembly of certain components.
Figure 11:
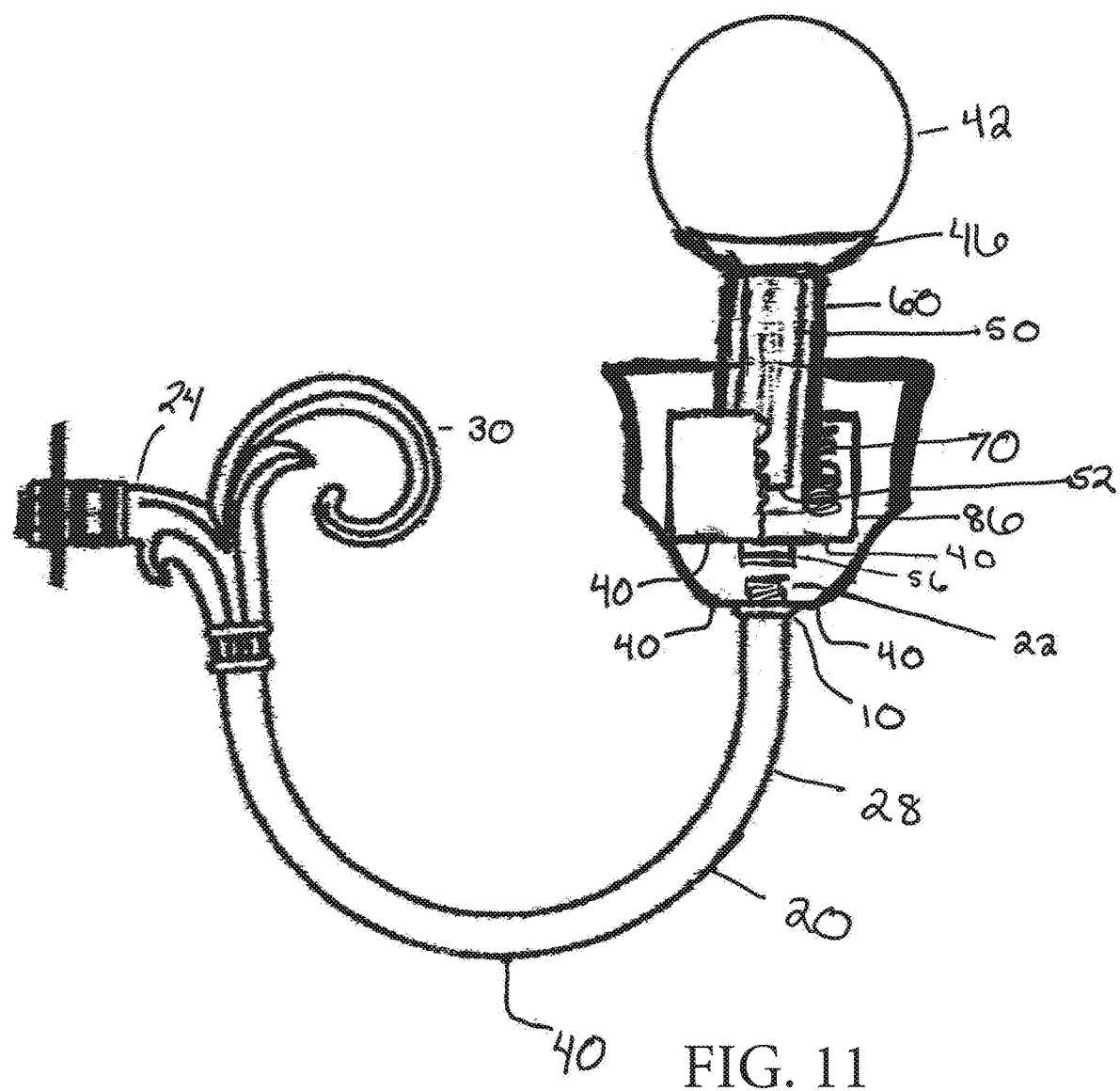
FIG. 11 is an exploded side sectional view of certain components of solar light fixture of FIGS. 1, 3, 16-19 illustrating improvements, sample method of said improvements and assembly of certain components.
Figure 16:
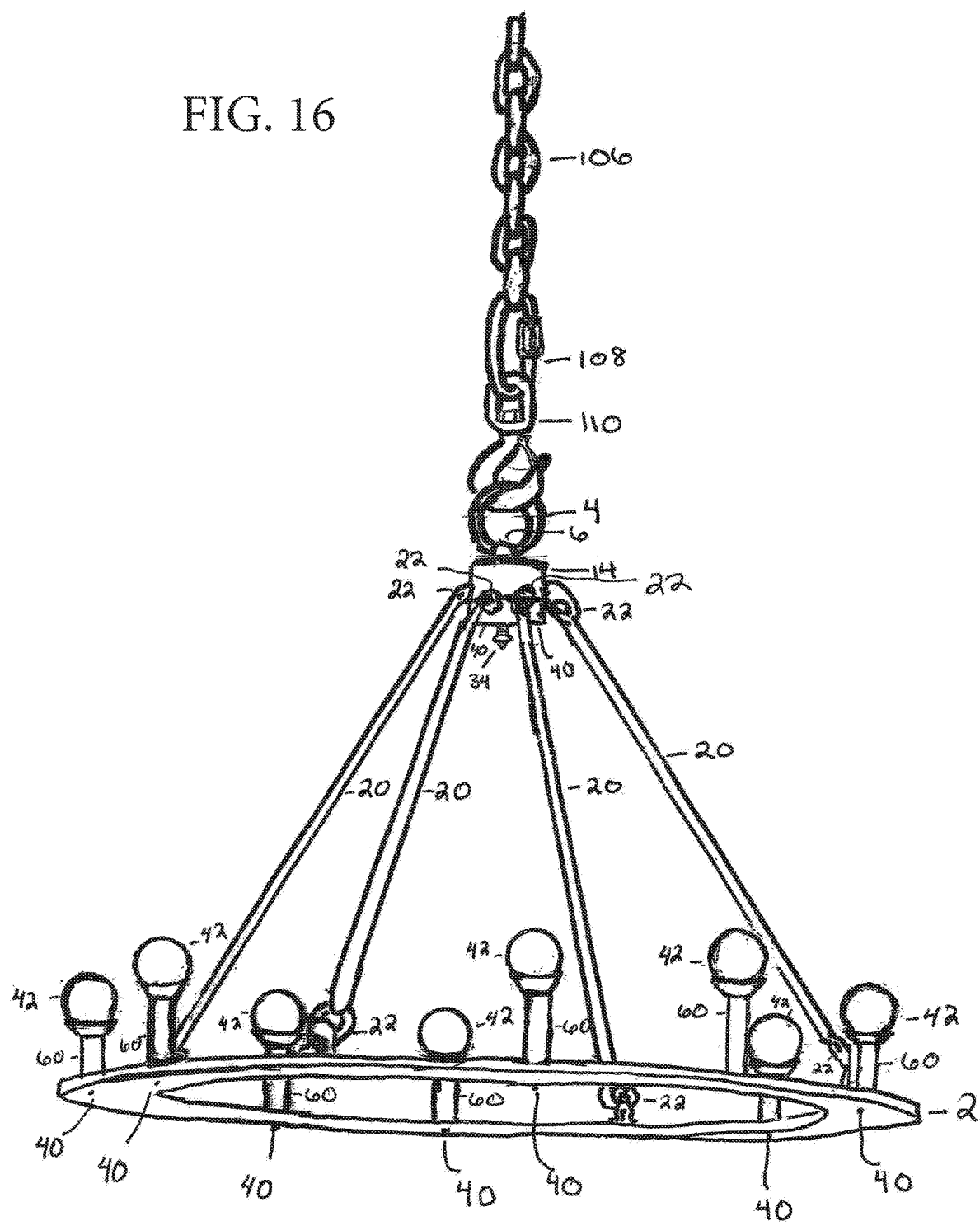
FIG. 16 is a front elevational view illustrating solar light fixture constructed in accordance with the principles of the invention.

Rod tube 60 is permanently affixed into the center inside well of candle cup 38 surrounding socket nut 56 and optional lock washer 58 as described in FIGS. 3 and 5, onto bobeche 36 as seen in FIGS. 1 and 6; constructed with base plate 62 containing corresponding interior screw threads 64 as described in FIGS. 7, 8, 9, 18-19; set into solar light fixture components as in FIG. 16; molded onto arm 20 in production; constructed with male screw threads 70 at lower rod tube 60 which fasten to female threads adapted for safety electrical socket 86 FIG. 11, with adaptations to and variations of all methods incorporated and adopted as improvement to invention. Rod tube 60 may be affixed via welding, outdoor adhesive, tab and slot method, incorporating into molding process of candle cup 38, bobeche 36, arm 20 or any variation thereof. Battery housing 50 of solar light bulb 42 inserted vertically into and held by secured rod tube 60, providing secure yet removable fit of solar light bulb 42 to solar light fixture.

Figure 28:
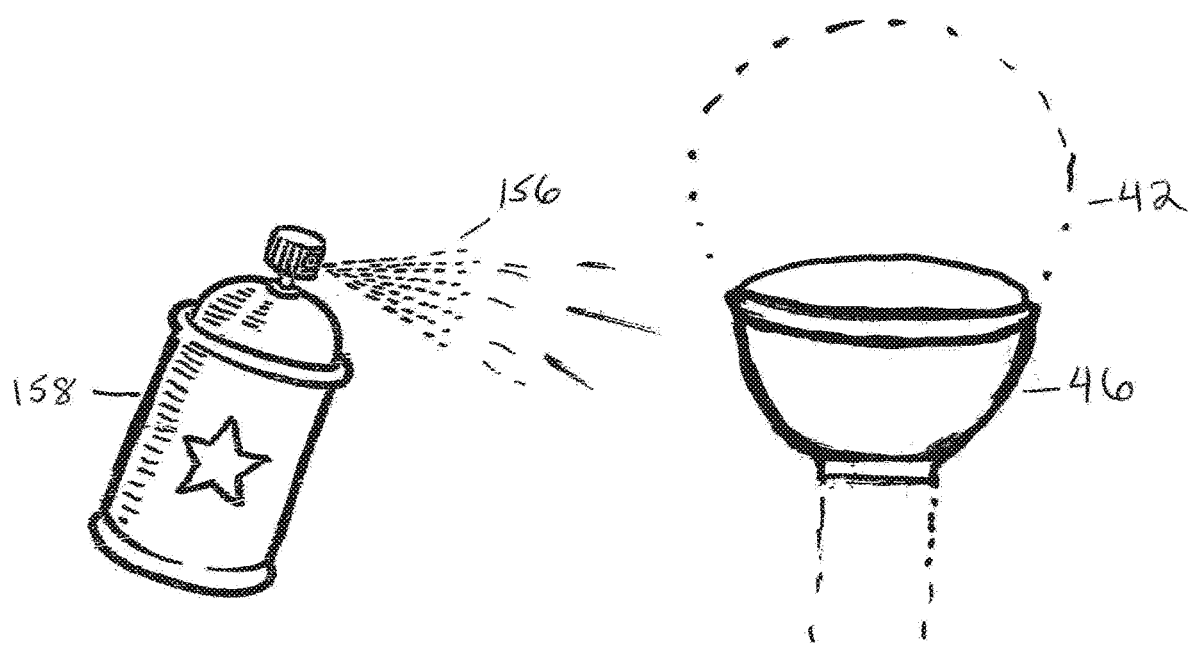
FIG. 28 is an exploded side elevational view illustrating an improvement to component of solar light fixture and sample methods of said improvement to invention.
Figure 29:
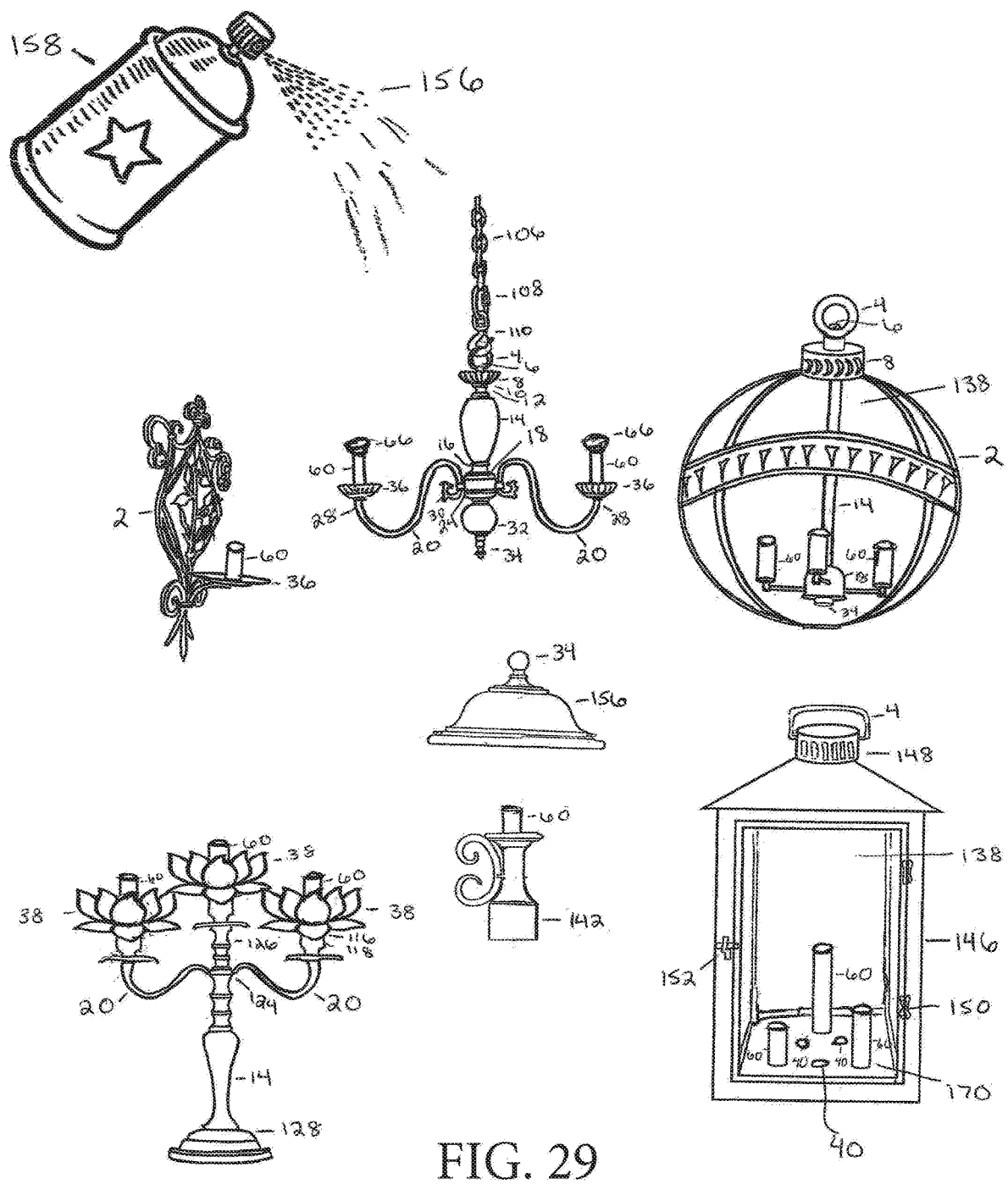
FIG. 29 is a side elevational view illustrating an improvement and sample methods of said improvement to invention.
Figure 30:
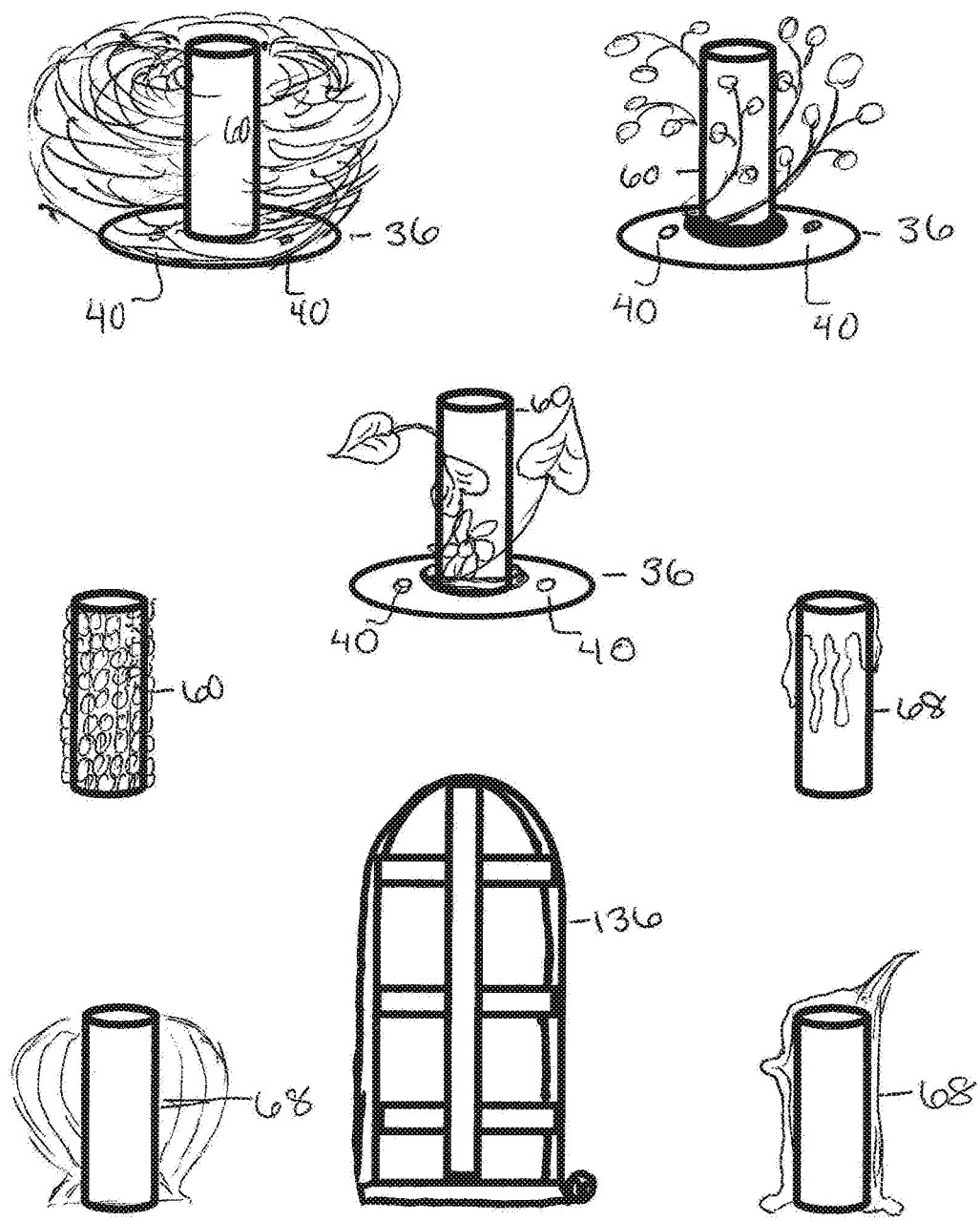
FIG. 30 is a side elevational view illustrating sample improvements to invention.

Rod tube 60 may be enhanced in its design as further detailed in FIG. 28-29, embellished as detailed in FIG. 30, crafted to resemble a dripping candle such as vintage chandeliers containing candle covers 51 and incorporates any other mode or manner of embellishment and not meant to be limited to ones mentioned. It is noted size of candle covers 51 as currently manufactured not recommended for use as, or over, rod tube 60, their diameter either too small or large and materials found to be overall too fragile. New candle covers 51 of appropriate size and durable materials to cover, or act as, rod tube 60 may be manufactured, an improvement to invention.

Upper rim of rod tube 60 may be constructed with attached solar housing cup 66, an improvement to invention, of approximate dimension of solar housing 46 with center opening width allowing passage of battery housing 50 into rod tube 60, which may extend slightly upwards and/or outwards around lowest edge of clear crackle ball glass lens 44, be decorative in nature, particularly useful in disguising color of solar housing 46 as currently available further described in FIGS. 7, 9, 20, 29. Exterior paint/finish or specialty coating 156 may be applied to rod tube 60 and solar housing cup 66 to match or complement solar light fixture wherein currently manufactured solar light bulb 42 may be used with its solar housing 46 unseen, further detailed in FIG. 28-30.

An improvement to invention is to establish universal standard sizes of solar light bulb 42 and rod tube 60 be adopted for use in solar light fixtures and suggest the Large and Petite sizes currently manufactured be adopted. An improvement to invention is to modify clear crackle ball glass lens 44 of solar light bulb 42 to more closely resemble candle flame or flower bud, a combination of both, Edison style, teardrop, torpedo, faceted, crackle, or other design or variation pleasing for use in solar light fixture of glass, high quality, durable, scratch free clear or faceted plastic, Pyrex® or other material suitable and appropriate for outdoor use, combination or variations encompassed in this invention.

An improvement to invention is that components comprising solar light bulb 42 be recyclable. A further improvement to invention for ease of recycling solar light bulb 42 is to adapt solar housing 46 to accept twist on, snap on, tab insertion or similar methods implied hereto, of clear crackle ball glass lens 44 for secure yet removeable fit. When solar light bulb 42 has run its course, clear crackle ball glass lens 44 easily removes from solar housing 46 in event both components are/continue to be recycled separately. An improvement to invention is to replace the NiCd rechargeable battery 48 commonly provided with solar light bulb 42 with an NiMh (Nickel Metal Hydride) rechargeable battery 48 which delivers more power lasting hours longer in these full drain devices, and can be charged up to 1000 times providing three to four years of daily use. NiCd rechargeable batteries 48 contain cadmium which is hazardous to the environment. NiMh rechargeable batteries 48, free of toxic or hazardous elements such as cadmium, lead, mercury or lithium, can be disposed of safely.

FIG. 5 illustrates rod tube 60 permanently affixed into center inside well of candle cup 38 surrounding socket nut 56 and optional lock washer 58 as described in FIG. 3, and is improvement to invention. Rod tube 60 may be attached to candle cup 38 either prior to or after incorporation of drain holes 40 to candle cup 38, as described in FIGS. 1, 3-12, 16-19. Drain holes 40 added to candle cup 38 at locations of lowest level when upright surrounding outer rod tube 60 when assembled; and, at base between location of inner rod tube 60 and outside socket nut 56 when assembled. Hollow outer arm 28 may be capped or plugged preventing water draining into arm 20. Rod tube 60 may be affixed to candle cup 38 via welding, outdoor adhesive, tab and slot method, incorporating into molding process of candle cup 38 or any variation or method thereof. Candle cup 38 inserted over and on top of arm nipple 22 of outer arm 28 onto check ring 10. Socket nut 56 is placed in lower center of candle cup 38 and rod tube 60 and fastened to arm nipple 22 of outer arm 28 holding candle cup 38 securely to arm 20. An optional lock washer 58 may be used under socket nut 56 if determined to provide a more secure fastening of candle cup 38 to outer arm 28. Battery housing 50 of solar light bulb 42 inserted vertically into rod tube 60, its solar housing 46 resting on upper rim of rod tube 60. Arm 20 with scroll 30 and arm back 24 contains drain hole 40 at lowest level.

FIG. 6 illustrates rod tube 60 permanently affixed into the center inside well of bobeche 36 surrounding socket nut 56 and optional lock washer 58 as described in FIG. 3, and is an improvement to invention. Rod tube 60 may be attached to bobeche 36 either prior to or after incorporation of drain holes 40 to bobeche 36. Drain holes 40 added to bobeche 36 at locations of lowest level when upright surrounding outer rod tube 60 when assembled; and at base between location of inner rod tube 60 and outside socket nut 56 when assembled. Hollow outer arm 28 may be capped or plugged preventing water draining into arm 20. Rod tube 60 may be affixed to bobeche 36 via welding, outdoor adhesive, tab and slot method, incorporating into molding process of bobeche 36 or any variation or method thereof. Center open hole 7 of bobeche 36 inserted over and on top of arm nipple 22 onto check ring 10 as molded onto outer arm 28. Socket nut 56 is placed in lower center of bobeche 36 and rod tube 60 and fastened to arm nipple 22 of outer arm 28 holding candle cup 38 securely to arm 20. An optional lock washer 58 may be used under socket nut 56 if determined to provide a more secure fastening of bobeche 36 to outer arm 28. Battery housing 50 of solar light bulb 42 inserted vertically into rod tube 60, its solar housing 46 resting on upper rim of rod tube 60. Arm 20 with scroll 30 and arm back 24 contains drain hole 40 at lowest level.

Figure 7:
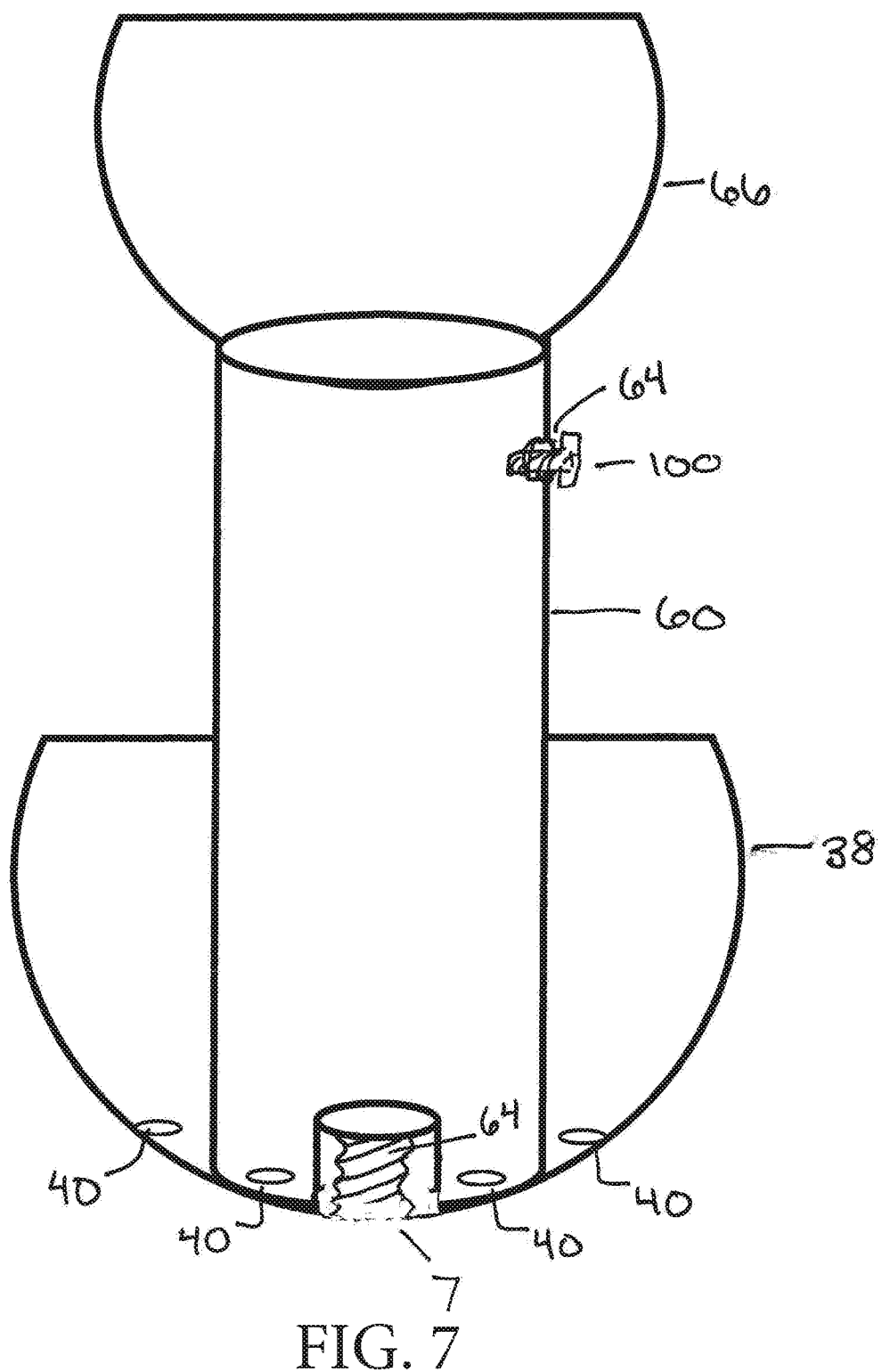
FIG. 7 is an exploded side sectional view illustrating improvements and sample method of said improvements to invention of FIGS. 1, 3, 16-19.

FIG. 7 illustrates exploded overhead sectional view of candle cup 38 and rod tube 60 newly constructed as one component with center interior raised incorporating interior screw threads 64 directly corresponding to arm nipple 22, essentially modifying center open hole 7, thereby replacing socket nut 56 and is an improvement to invention. Rod tube 60 attached or molded to center base candle cup 38. Rod tube 60 may also comprise solar housing cup 66 attached to upper rim of rod tube 60 to disguise solar housing 46 as described in FIGS. 4, 9, 20, 29-30. Vertical side rod tube 60 contains interior screw threads 64 and matching thumb screw 100 to further secure battery housing 50 to rod tube 60, described in FIGS. 4, 20, 24, 27 and 29. Drain holes 40 inside and outside lower rod tube 60 in candle cup 38. Interior screw threads 64 of candle cup 38 fasten to arm nipple 22. This method caps outer arm 28, disguises solar housing 46, and provides simple assembly of candle cup 38 with rod tube 60 to arm nipple 22 of outer arm 28. This method applies equally to bobeche 36 as further described in FIG. 8, and/or any other decorative adornment to complement style of solar light fixture which holds rod tube 60. Battery housing 50 of solar light bulb 42 inserted vertically into secured rod tube 60 with candle cup 38, fastened securely with thumb screw 100.

Figure 8:
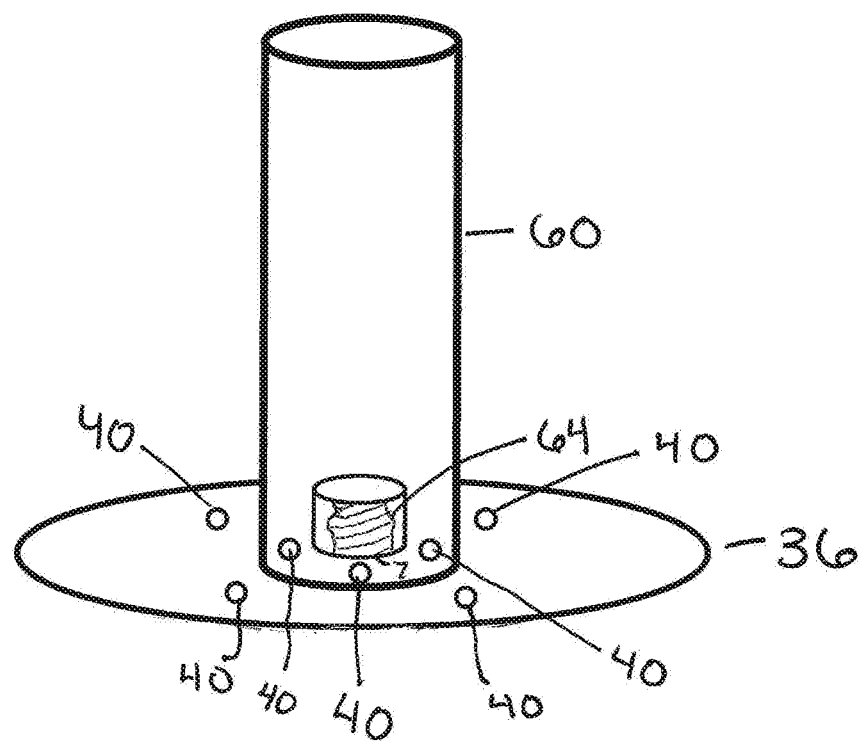
FIG. 8 is an exploded side sectional view of illustrating an improvement and sample method of said improvement to invention of FIGS. 1, 3, 16-19.

FIG. 8 illustrates exploded overhead sectional view of bobeche 36 newly constructed with center interior raised incorporating interior screw threads 64 underneath and within modifying center open hole 7, which tighten to arm nipple 22 of outer arm 28, an improvement to invention. Rod tube 60 attached or molded to bobeche 36. Drain holes 40 inside and outside lower rod tube 60 in bobeche 36. Bobeche 36 with attached rod tube 60 with interior screw threads 64 fasten to arm nipple 22. This method caps outer arm 28 providing simple assembly of bobeche 36 with rod tube 60 to arm nipple 22 of arm 20.

Figure 9:
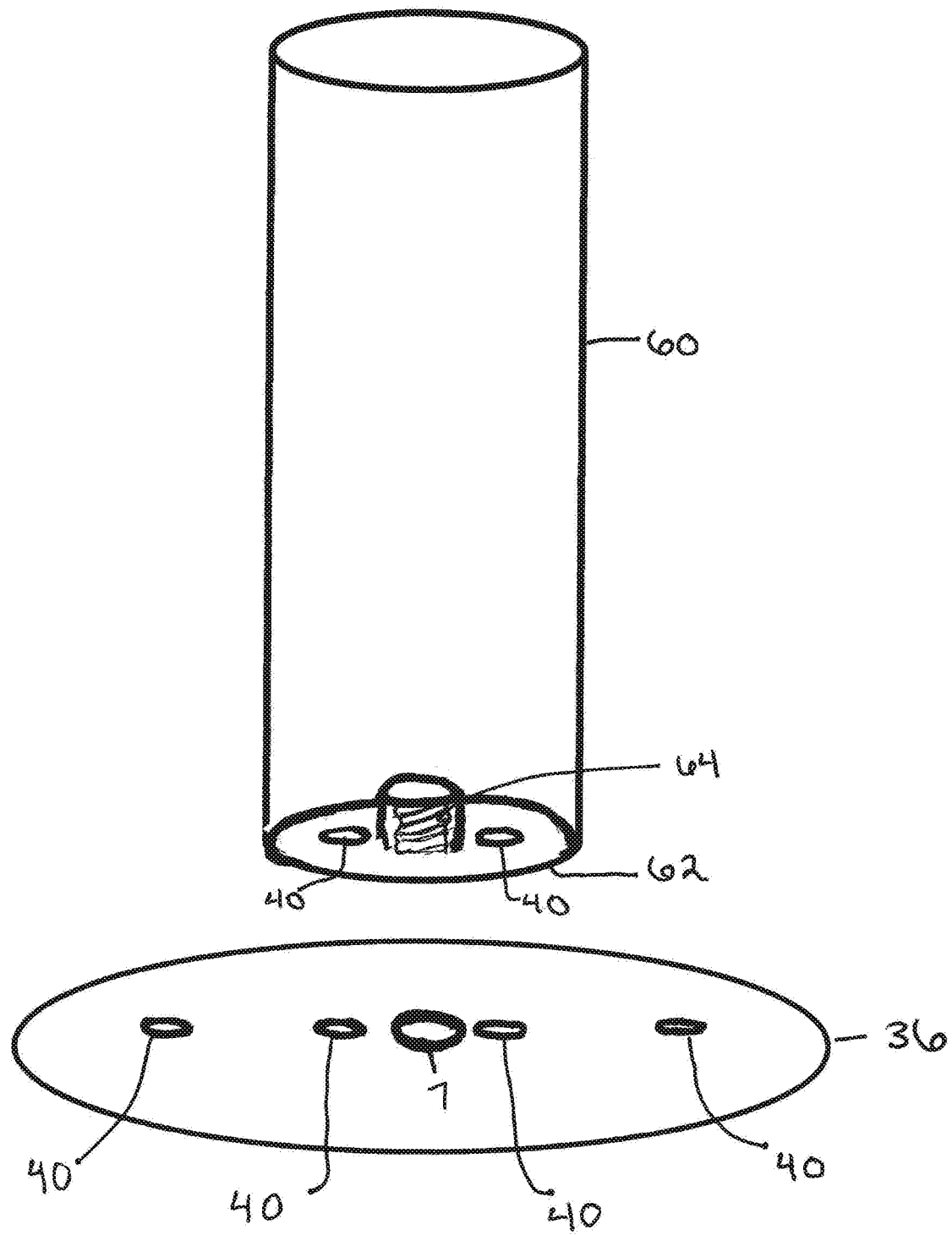
FIG. 9 is an exploded side sectional view of illustrating an improvement and sample method of said improvement to invention of FIGS. 1, 3, 16-19.

FIG. 9 illustrates an alternative improvement to construct rod tube 60 with molded base plate 62 incorporating interior screw threads 64 and containing drain holes 40. Base plate 62 of rod tube 60, containing drain holes 40, comprised of raised center interior incorporating interior screw threads 64 underneath and within which fasten to arm nipple 22 of outer arm 28, of which the interior screw threads 64 are capped in the topmost position, an improvement to invention. Rod tube 60 may also be comprised of solar housing cup 66 attached to upper rim of rod tube 60 to disguise solar housing 46 as described in FIGS. 4, 7, 20 and 29. Bobeche 36 contains drain holes 40 within interior and outside dimension of assembled base plate 62 illustrated for example and applies to candle cup 38 and/or any decorative adornment to complement style of solar light fixture. This method requires ensuring drain holes 40 of bobeche 36, or candle cup 38 if used, lined up vertically with drain holes 40 in newly constructed base plate 62 of rod tube 60. Center open hole 7 of bobeche 36 is placed over arm nipple 22. Rod tube 60 with molded base plate 62 is then screwed downward onto arm nipple 22 fastening bobeche 36 to outer arm 28. This method caps outer arm 28, ensures drainage and provides simple assembly of rod tube 60 to arm 20 and may be improved upon with addition of exterior paint/finish or specialty coating 156 or embellishment as further described in FIGS. 28-29, all improvements to invention.

Figure 10:
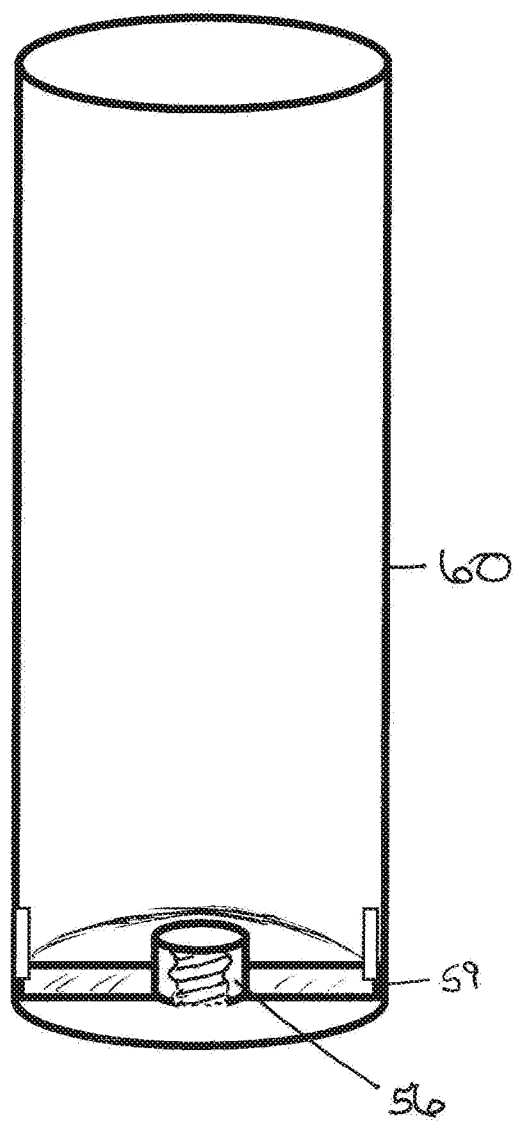
FIG. 10 is an exploded side sectional view of illustrating an improvement and sample method of said improvement to invention of FIGS. 1, 3, 16-19.

FIG. 10 illustrates an alternate improvement to invention. Socket nut 56 may be attached to rod tube 60 similarly to electric socket 74 attachment as constructed for chandelier candelabra electric light bulbs 78 wherein the socket nut 56 attached to metal strip bent to seat at lowest level of center inner rod tube 60 as attached to lowest ¼" vertical sides inner or bottom of rod tube 60. As socket nut 56 essentially suspended within inner rod tube 60, drainage incorporated on open sides. Socket nut 56 may be top capped to seal arm nipple 22 of outer arm 28.

FIG. 11 illustrates an improvement to invention which constructs rod tube 60 with outer male screw threads 70 at end corresponding to female screw threads of electrical socket 86 adapted to include drainage and/or drain holes 40, lighting components removed. For example, male screw threads 70 found at base of electric light bulb 88, or that specific part adapted to include drain holes 40 or of open bottom, and fitted to outside of rode tube 38. Consideration must be given to possibility of accidental insertion of threaded rod tube 60 to wired electrical light fixture which may impose a safety hazard. Rod tube 60 must be of a height to ensure battery housing 50 and battery cover and screw 52 of solar light bulb 42 do not meet connection of electrical socket 86 if accidently fastened to wired electric light fixture. It is noted male screw threads 70 may be attached directly to battery housing 50 for insertion into adapted with improvements electrical socket 86. A floating or unattached rod tube 60 of appropriate size may be added over upper battery housing 50, acting as candle cover 68, or variation thereof.

Drain holes 40 added to candle cup 38 at locations of lowest level when upright surrounding outer rod tube 60 when assembled. Arm nipple 22 of outer arm 28 may be capped or plugged preventing water draining into arm 20. Rod tube 60 with male screw threads 70 screwed into adapted with improvements electrical socket 86 as attached to arm nipple 22 of outer arm 28 onto check ring 10. Solar light bulb 42 battery housing 50 inserted vertically into rod tube 60, its solar housing 46 resting on upper rim of rod tube 60. Arm 20 with scroll 30 and arm back 24 contains drain hole 40 at lowest level.

Figure 12:
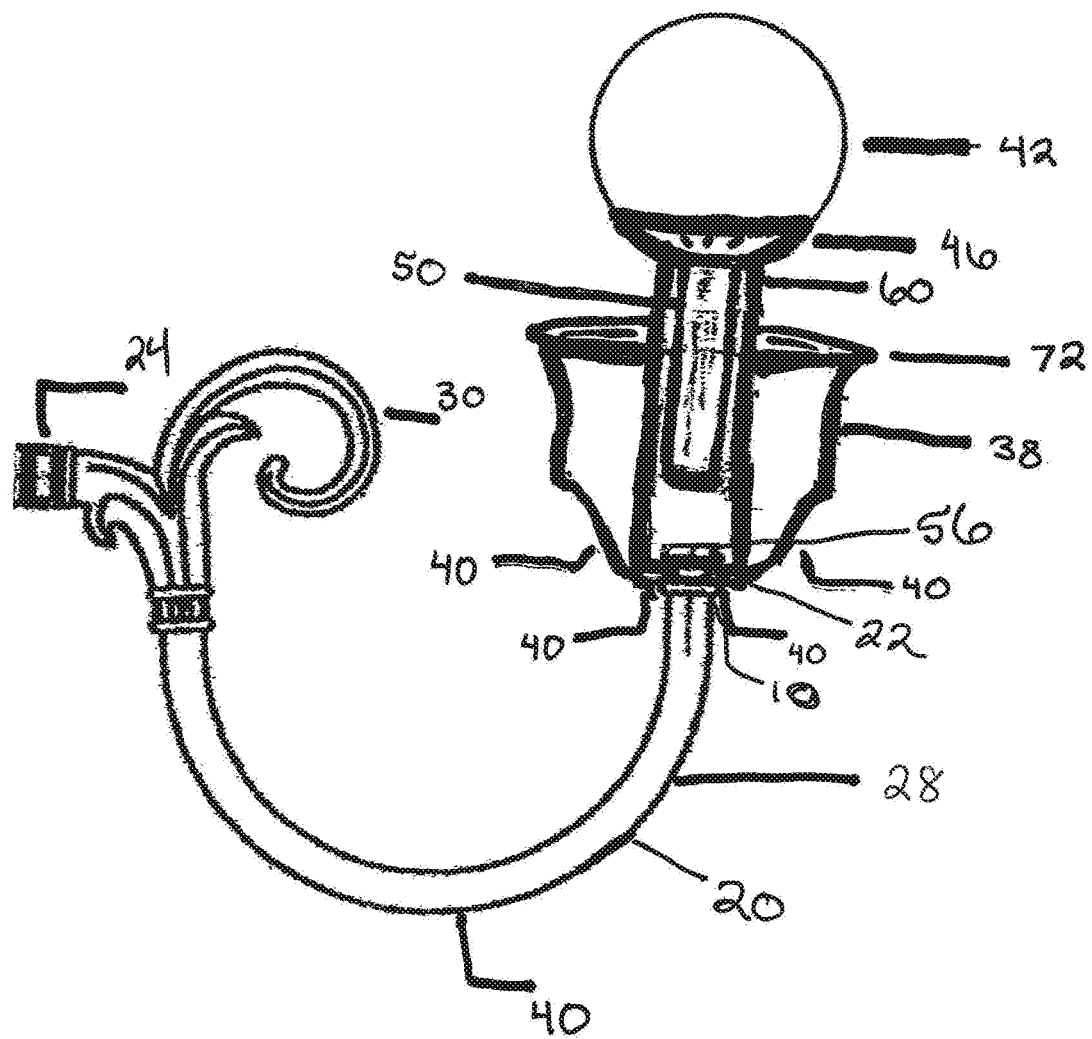
FIG. 12 is an exploded side sectional view of certain components of solar light fixture of FIGS. 1, 3, 16-19 illustrating an improvement to invention, improvements, sample method of said improvements and assembly of certain components.

FIG. 12 illustrates improvement to invention of a splash guard 72 inserted over rod tube 60 on top upper rim of candle cup 38. Splash guard 72 provides debris and precipitation deflection and prevents accumulation of leaves and ordinary outdoor debris in candle cup 38 in course of ordinary use. Splash guard 72 may be of any material and style complementary to solar light fixture and size of candle cup 38. Splash guard 72 is of a width larger than top opening of candle cup 38 with center hole of a width large enough to surround circumference of rode tube 38. Splash guard may be constructed to snap on candle cup 38, may be firmly affixed, placed on top rim of candle cup 38 or variations thereof. Candle cup 38 inserted over and on top of arm nipple 22 of outer arm 28 onto check ring 10. Rod tube 60 with socket nut 56 attachment as described in FIG. 10 inserted into candle cup 38 screwing onto arm nipple 22 attaching both to check ring 10 of outer arm 28. Drain holes 40 remain incorporated into candle cup 38 as detailed in FIGS. 1, 3, 5, 7, 9-12, 18-19. Solar light bulb 42 battery housing 50 inserted vertically into rod tube 60, its solar housing 46 resting on upper rim of rod tube 60. Arm 20 with scroll 30 and arm back 24 contains drain hole 40 at lowest level.

Figure 13:
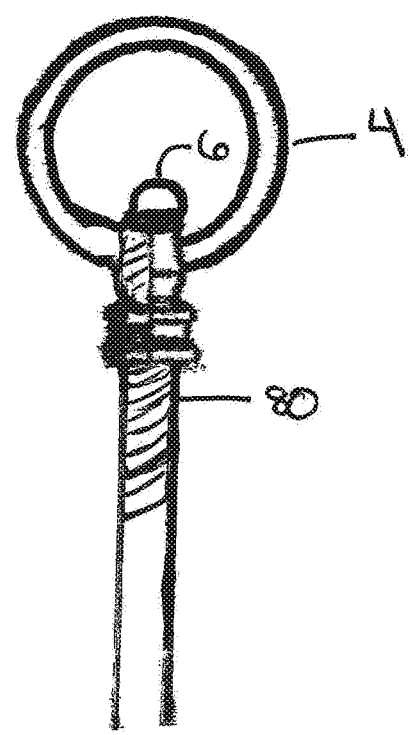
FIG. 13 is an exploded side sectional view of certain components of solar light fixture of FIGS. 1, 3, 16-17 and 25 illustrating improvements and sample method of said improvements.

FIG. 13 illustrates an improvement to invention utilizing a fixture hanger loop 4 as currently manufactured comprised of a top ring and screw which fastens to nipple 80. Fixture hanger loop 4 traditionally contains center opening to allow passage of electrical wire 84 from within nipple 80 to electrical source. An improvement is to add a plug or top screw 6 to the top center opening of fixture hanger loop 4 to deflect precipitation and outdoor debris from entering inside of nipple 80 inside solar light fixture. Another improvement to invention is to securely affix fixture hanger loop 4 to nipple 80. This method ensures natural rotation of solar light fixture in outdoor wind conditions and does not unscrew solar light fixture from fixture hanger loop 4 as hanging and in use as further described in FIGS. 13-15. It may be found a shackle nut is contained within fixture hanger loop 4, fitted with a stop screw designed to prevent the shackle nut from unscrewing, making fixture hanger loop 4 free to turn 360°, which design is incorporated fully for purposes of this invention with improvements. Solar light fixture assembled from top of nipple 80 to bottom, secured with finial 34.

Figure 14:
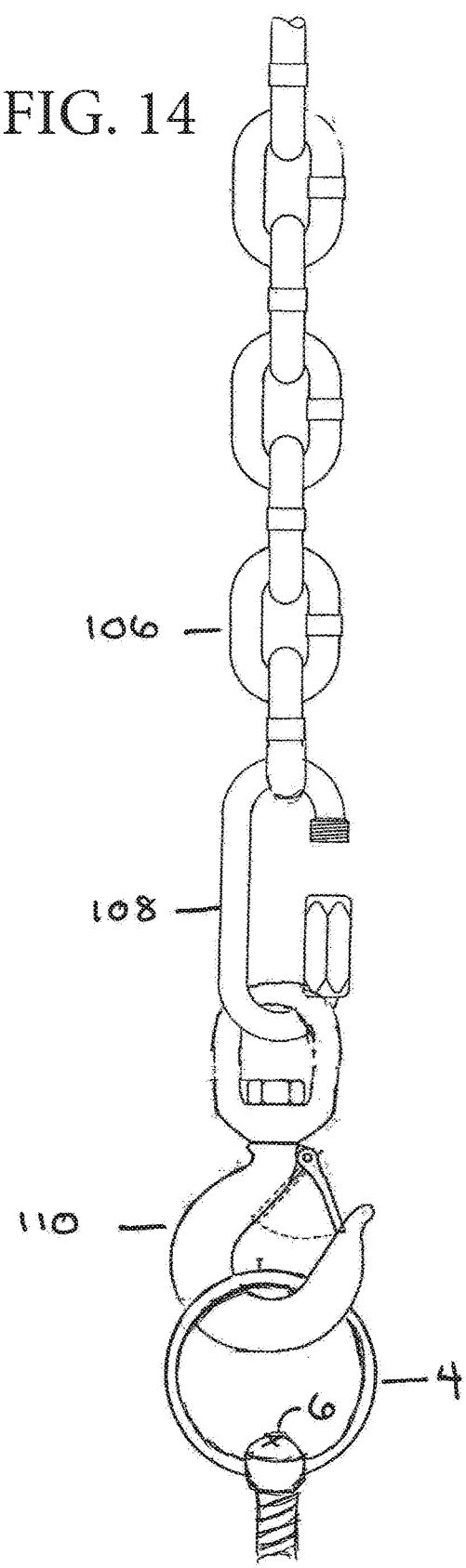
FIG. 14 is an exploded side sectional view of certain components of solar light fixture of FIGS. 1, 3, 16-17 and 25 illustrating improvements to invention.

FIG. 14 illustrates the addition of swivel snap hook 110 between fixture hanger loop 4 and chain 106 for suspending solar light fixture from above and is an improvement to invention. In high winds suspended solar light fixture will have tendency to rotate slightly. Swivel snap hook 110, also known as swivel shackle, allows rotation of solar light fixture through its hardware, eliminating wind driven rotation placing unnecessary stress on affixed fixture hang loop 4 to nipple 80. This improvement unnecessary if fixture hanger loop 4 molded to nipple 80 or frame of solar light fixture or contains shackle nut to allow rotation; however, found beneficial in high wind areas to avoid twisting of suspension chain 106. Components comprising the suspension mechanism for solar light fixture illustrated are chain 106 with swivel snap hook 110 attached via quick link 108. Swivel snap hook 110 clipped to fixture hanger loop 4 with attached plug or top screw 6 and further described in FIGS. 1, 15-17. Chain 106 representative of all materials conducive to suspension of solar light fixture including bicycle chain, plastic coated steel cable and rope, not meant to be limited to specific items mentioned. It is noted chain 106 may be run through overhead block and tackle pulley system to enable ease in raising and lowering suspended solar light fixture in order to access solar light bulb 42.

Figure 15:
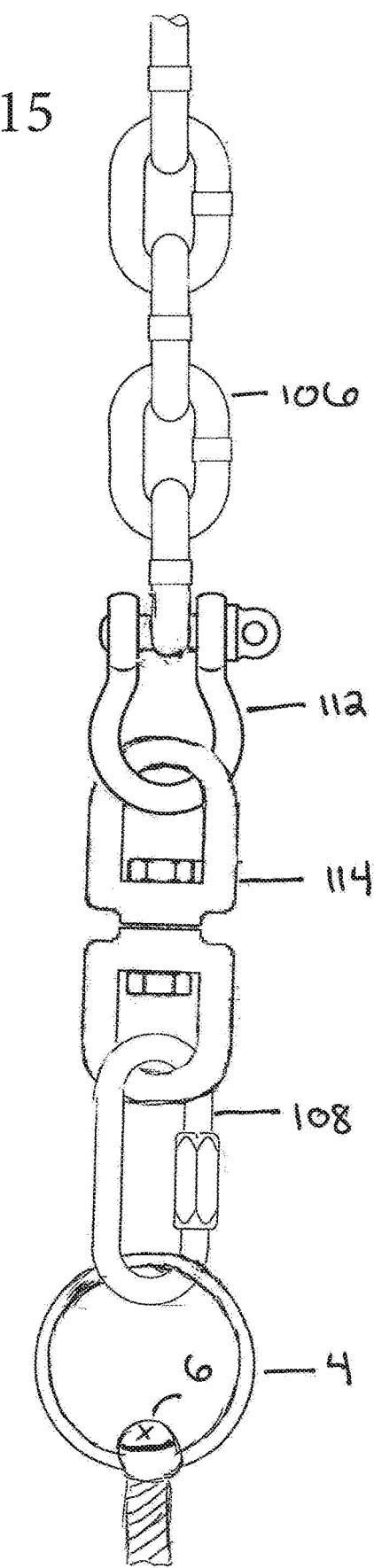
FIG. 15 is an exploded side sectional view of certain components of solar light fixture of FIGS. 1, 3, 14, 16-17 and 25 illustrating improvements to invention.

FIG. 15 illustrates addition of swivel eye-eye link 114 between fixture hanger loop 4 and chain 106 for suspending solar light fixture from above and is an improvement to invention. The swivel eye-eye link 114, also representing swivel eye jaw link which contains shackle at one end, allows rotation of solar light fixture through its hardware, eliminating wind driven rotation placing unnecessary stress on affixed fixture hang loop 4 to nipple 80. This improvement unnecessary if fixture hanger loop 4 molded to nipple 80 or frame of solar light fixture or contains shackle nut to allow rotation; however, found beneficial in high wind areas to avoid twisting of suspension chain 106. Components comprising suspension mechanism for solar light fixture illustrated here are upper eye of swivel eye-eye link 114 attached to chain 106 with shackle with screw pin 112, commonly known as D, Bow or Twisted Shackle. Quick link 108 connects lower eye of swivel-eye-eye link 114 to fixture hanger loop 4 with attached plug or top screw 6. These commonly manufactured components are provided by way of example. Quick link 108 and shackle with screw pin 112 may be interchanged or matched set of either may be used.

FIG. 16 comprises the invention in its assembled and ready-to-use state utilizing chandelier currently manufactured and available on retail market and commonly used components of same, some components of which have been improved upon in this invention, and applies to any light fixture of similar composition or style.

Components comprising the suspension mechanism for solar light fixture illustrated are chain 106 with swivel snap hook 110 attached via quick link 108, described in FIGS. 1, 14-15 and 17. Solar light fixture components illustrated described as: fixture hanger loop 4 with top screw 6 attached to nipple 80. Column 14 inserted over nipple 80 and fastened with finial 34 at bottom. Drain holes 40 in bottom of column 14. Electrical wire 84 eliminated. Arms 20 comprised of solid metal rod with hooks at both ends attached to rings or arm backs 22 in column 14 and rings or arm backs 24 of body 2, in this illustration, a round lineal ring. As arm 20 solid metal rod, drain holes 40 are not necessary in arm 20. Rod tube 60 replaces eliminated electrical socket 86 and attached to body 2 as detailed in FIGS. 1, 3-12, set directly into corresponding grooves incorporated into body 2, welded, adhered or molded into body 2. Drain holes 40 vertically through body 2 below position of inner rod tube 60. Battery housing 50 of solar light bulb 42 inserted vertically into rod tube 60. This method allows for a secure yet removable fit of solar light bulb 42 to solar light fixture with appropriate drainage.

Figure 17:
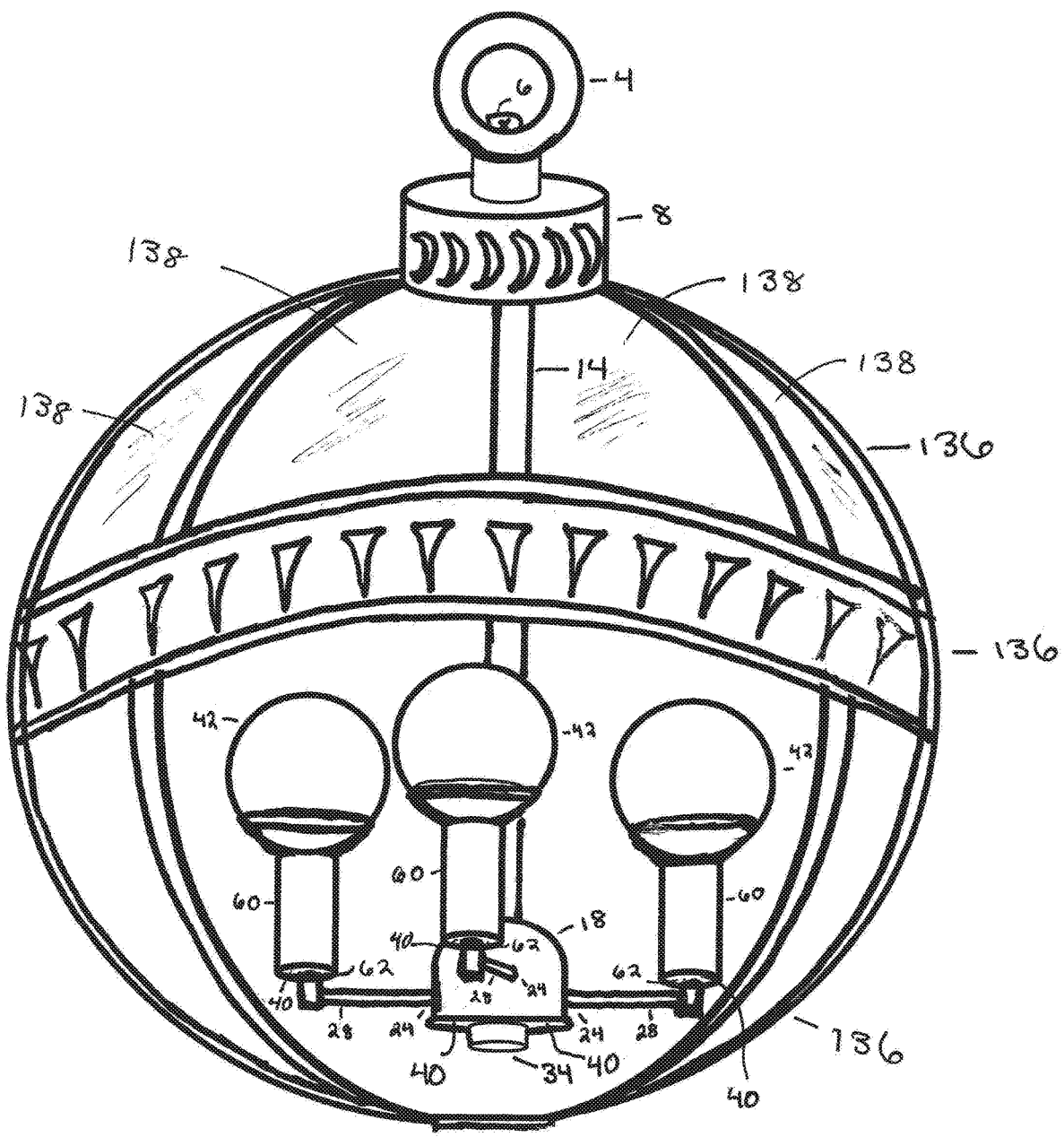
FIG. 17 is a front elevational view illustrating solar light fixture constructed in accordance with the principles of the invention.

FIG. 17 illustrates the invention in its assembled and ready-to-use state utilizing electric pendant lighting fixture currently manufactured and available on retail market and commonly used components of same, some of which have been improved upon in this invention, and applies to any light fixture of similar composition or style, including those illuminated with gas or fuel and apply to those fixtures with any number of arms 20 with improvements made to each. Electrical wire 84, electrical socket 86 eliminated entirely. As gravity holds battery housing 50 of solar light bulb 42 in rod tube 60, and solar light bulb 42 will absorb more energy in an upright position towards the sun, outer arm 28 should be in an upward position as further described in FIGS. 4-12, 16, 18-27. In the event outer arm 28 of pendant light fixture directed in downward position, arm 20 may be repositioned upwards, described in FIGS. 2-3, 18-19.

Solar light fixture components illustrated are described from the top downwards as: Fixture hanger loop 4 with plug or top screw 6 and lock washer 58 screwed onto and securely affixed to nipple 80 onto which remaining components are assembled. Top screw 6 affixed to top opening of fixture hanger loop 4 as described FIG. 13. Crown bobeche 8 assembled over nipple 80 abutting fixture hanger loop 4. Decorative cage 136, in this illustration comprised of circular metal rings to surround solar light fixture, containing clear glass panels 138 curved and cut to fit top half of decorative cage 136, or molded of Pyrex or other suitable material, attached to nipple 80 with socket nut 56 of appropriate size.

Column 14, in this instance a decorative hollow metal rod, inserted upwards over nipple 80 onto which arm body 18 is attached. Arm body 18 contains drain holes 40 at lowest level when suspended. As all electrical wire 84 is eliminated, hickey 82 attached to nipple 80 within arm body 18 may be utilized as part of the length of nipple 80. Alternatively, nipple 80 with hickey 82 may be replaced with one single nipple 80 of appropriate length, eliminating hickey 82. Arm 20 attached to arm body 18 by screwing arm back 24 into arm body 18, securely fastening with arm back nut 26. Alternatively, arm 20 may be molded directly to arm body 18. Arm body 18 fastened to nipple 80 with finial 34. Arm body 18 incorporated with drain holes 40 at lowest levels.

Rod tube 60, of a minimum height of 2″, with molded base plate 62 incorporating interior screw threads 64 and containing drain holes 40, as constructed and detailed in FIG. 9, screwed onto arm nipple 22 of outer arm 28. Battery housing 50 of solar light bulb 42 inserted vertically into rod tube 60. This method allows for a secure yet removable fit of solar light bulb 42 to solar light fixture, air circulation and drainage.

Figure 18:
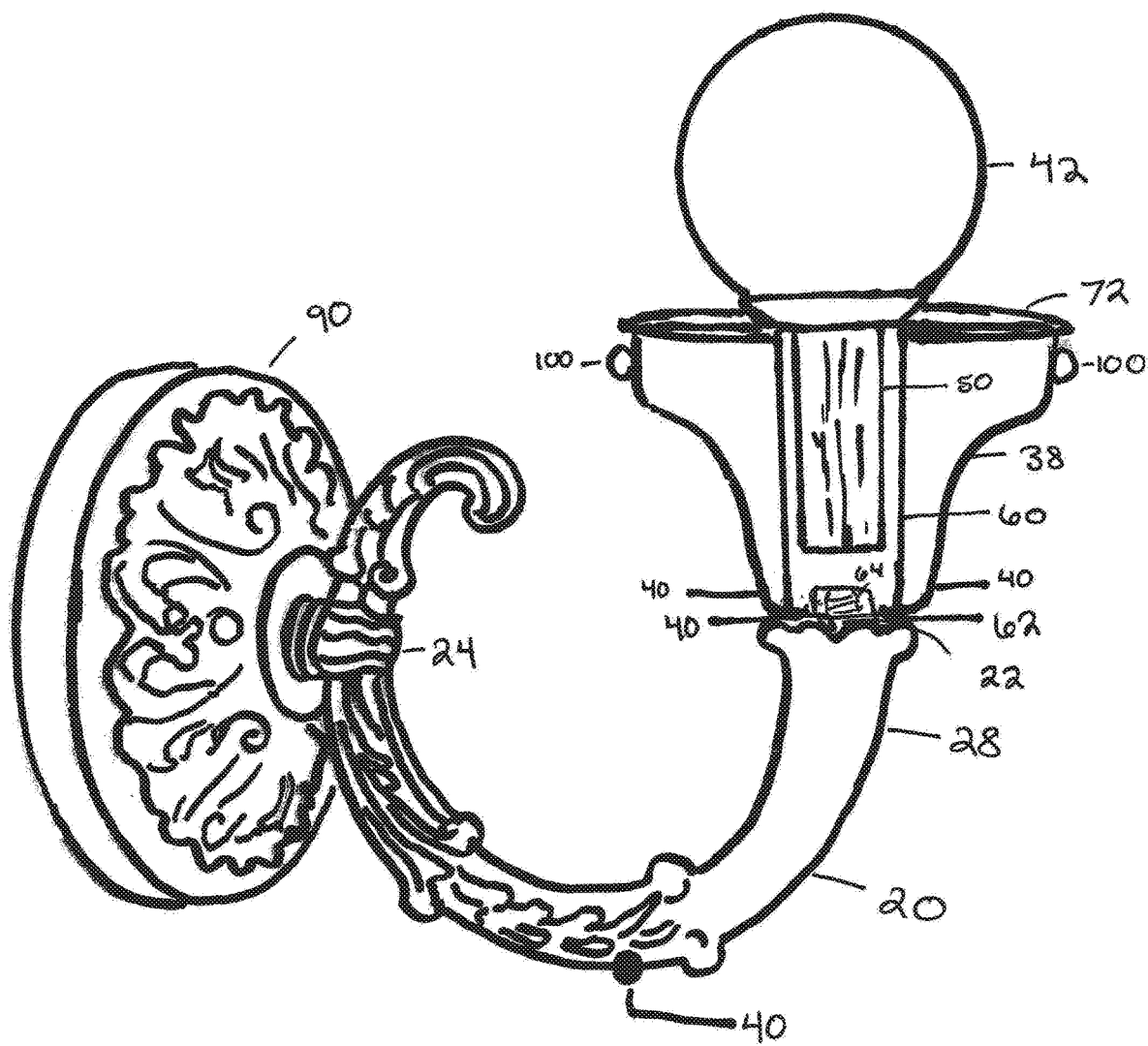
FIG. 18 is a front side sectional view illustrating solar light fixture constructed in accordance with the principles of the invention.

FIG. 18 illustrates the invention in its assembled and ready-to-use state utilizing electric wall sconce lighting fixture currently manufactured and commonly available on retail market and commonly used components of same, some of which have been improved upon in this invention, and applies to any light fixture of similar composition or style, including those illuminated with gas or fuel and applies to those fixtures with any number of arms 20 with improvements made to each. Electrical wire 84, electrical socket 86 eliminated entirely. As gravity holds solar light bulb 42 in rod tube 60, and solar light bulb 42 will absorb more energy in an upright position towards the sun, outer arm 28 should be in an upward position as further described in FIGS. 1, 3-12, 17 and 19. In the event outer arm 28 of electric wall sconce directed in downward position, arm 20 may be repositioned upwards in relation to back plate 90, securing arm back 24 to back plate 90 with arm back nut 26. Conversely, back plate mount 92 may be repositioned 180° in back plate 90.

Solar light fixture components illustrated are back plate 90 containing back plate mount 92 for attaching solar light fixture to any vertical outdoor surface such as wall, fence, post or tree. Arm 20, now in upright position, attached to back plate 90 by screwing arm back 24 into back plate 90 and securely fastening with arm back nut 26. Outer arm 28 constructed such that the width of outer arm 28 acts as check ring 10 inhibiting candle cup 38 or bobeche 32 from sliding down arm 20. Drain holes 40 added at lowest level of arm 20.

Solar light fixture utilizes improvement to invention of rod tube 60 constructed with molded base plate 62 incorporating interior screw threads 64 and containing drain holes 40 as detailed in FIG. 9. Candle cup 38, in this example, containing drain holes 40 in the lowest outer sides of candle cup 38, inserted over and on top of arm nipple 22 of outer arm 28. Rod tube 60 with molded base plate 62 and drain holes 40 inserted onto center of candle cup 38 and screwed onto arm nipple 22, thusly securing candle cup 38 to arm 20. Splash guard 72 inserted over rod tube 60 on top of upper rim of candle cup 38 providing debris and precipitation deflection, preventing accumulation of leaves and ordinary outdoor debris in candle cup 38 in course of ordinary use.

Glass sconce 98 with decorative ring 102 as attached with thumb screws 100 to sides of candle cup 38, as shown in FIG. 2, are eliminated. Candle cup 38 of electric wall sconce manufactured to contain glass sconce 98 will contain thumb screw 100 holes for the attachment of eliminated glass sconce 98. Solar light fixture illustrated replaces thumb screws 100 with adhesion of pearl head of corsage pin to candle cup 38. Candle cup 38 may be newly produced whereby thumb screw 100 holes are eliminated in production or adorned as described in FIG. 3.

Battery housing 50 of solar light bulb 42 is inserted vertically into rod tube 60. This method allows for a secure yet removable fit of solar light bulb 42 to solar light fixture.

Figure 19:
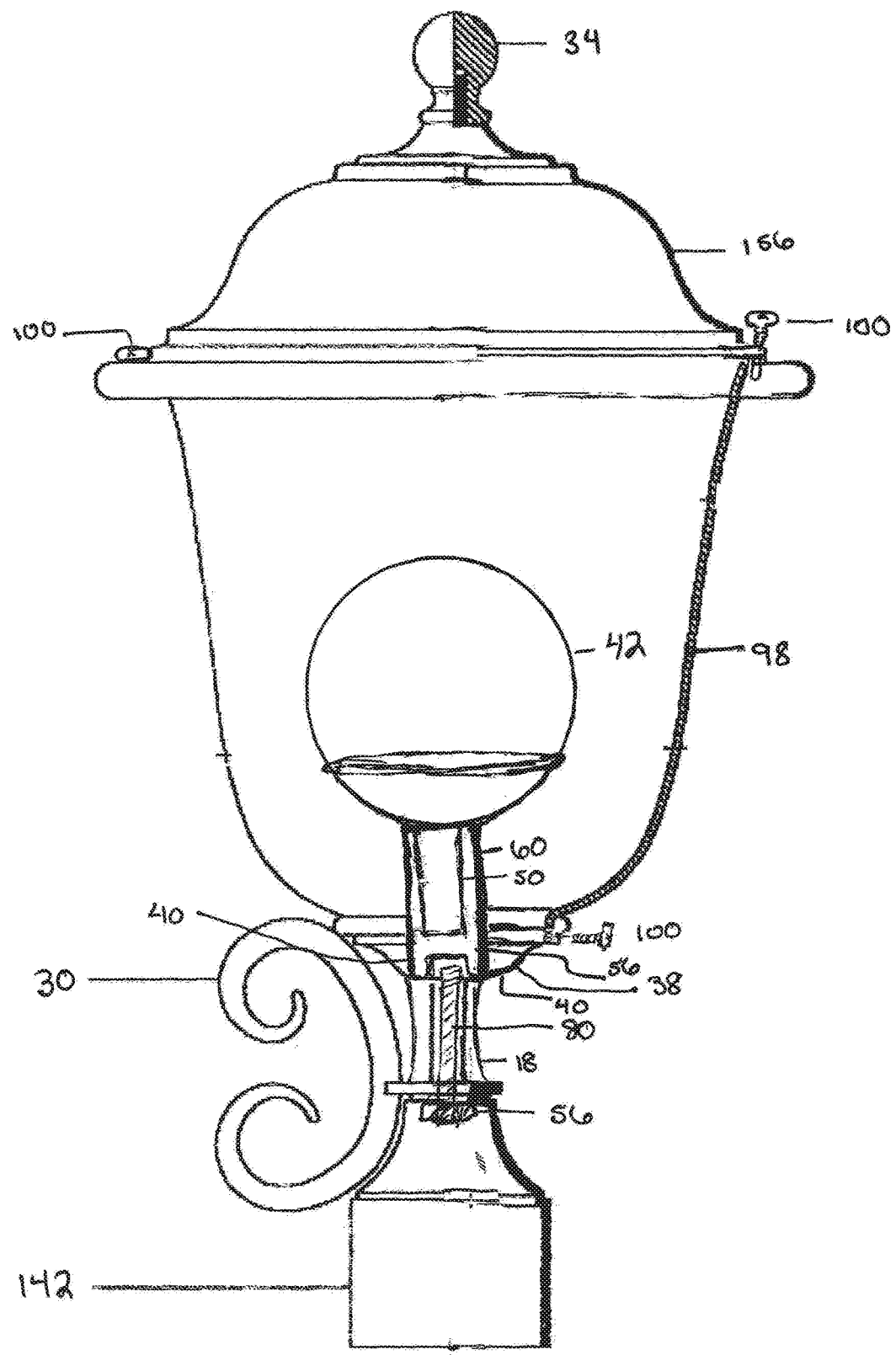
FIG. 19 is a front elevational sectional view illustrating solar light fixture constructed in accordance with the principles of the invention.

FIG. 19 illustrates the invention in its assembled and ready-to-use state utilizing post mounted lighting fixture, aka post lamp, currently manufactured and available on retail market and commonly used components of same, some of which have been improved upon in this invention, and applies to any light fixture of similar composition or style, including those illuminated with gas or fuel and apply to those fixtures with any number of arms 20 with improvements made to each. Electrical wire 84, electrical socket 86 or burner eliminated entirely. As gravity holds solar light bulb 42 in rod tube 60, and solar light bulb 42 will absorb more energy in an upright position towards the sun, rod tube 60 should be in an upward position. In the event outer arm 28 of electric light fixture directed in downward position, arm 20 and/or rod tube 60 may be repositioned upwards, described in FIGS. 2-3, 17-18.

Solar light fixture components illustrated described from lower upwards as: post cap 142 generally a circular hollow component constructed to fit over solid post as driven into ground, onto which nipple 80 is secured with socket nut 56. Arm body 18, comprised of scroll 30, inserted onto nipple 80. Rod tube 60 permanently affixed into center inside well of candle cup 38, inserted as unit, over and onto nipple 80, secured with socket nut 56 and optional lock washer 58 as described in FIGS. 3 and 5. Drain holes 40 added to candle cup 38 at locations of lowest level when upright surrounding outer rod tube 60 when assembled. As solar light fixture components largely encased in glass sconce 98, water exposure will be minimal; however, drain holes 40 recommended compensate for any condensation which may form within glass and promote air circulation. In solar light fixture illustrated, drain holes 40 incorporated in sides of rod tube 60 approximately ¼" above base of candle cup 38. Nipple 80 may be capped with top screw 6 preventing moisture draining into nipple 80. Rod tube 60 may be affixed to candle cup 38 via any method or variation previously described including molding as one unit, as detailed in FIGS. 5-12.

Glass sconce 98 inserted into candle cup 38, secured with thumb screws 100 at side of candle cup 38. Glass sconce 98 may be permanently adhered or attached to candle cup 38 or contain its own base plate 62 for placement onto nipple 80. Battery housing 50 of solar light bulb 42 inserted vertically into secured rod tube 60. Hood 156 placed over glass sconce 98, secured with thumb screws 100. Finial 34 attached to hood 156. Solar light bulb 42 accessed by unscrewing thumb screws 100 of hood 156; remove hood 156 and reach downward into glass sconce 98, all improvements to invention.

Figure 20:
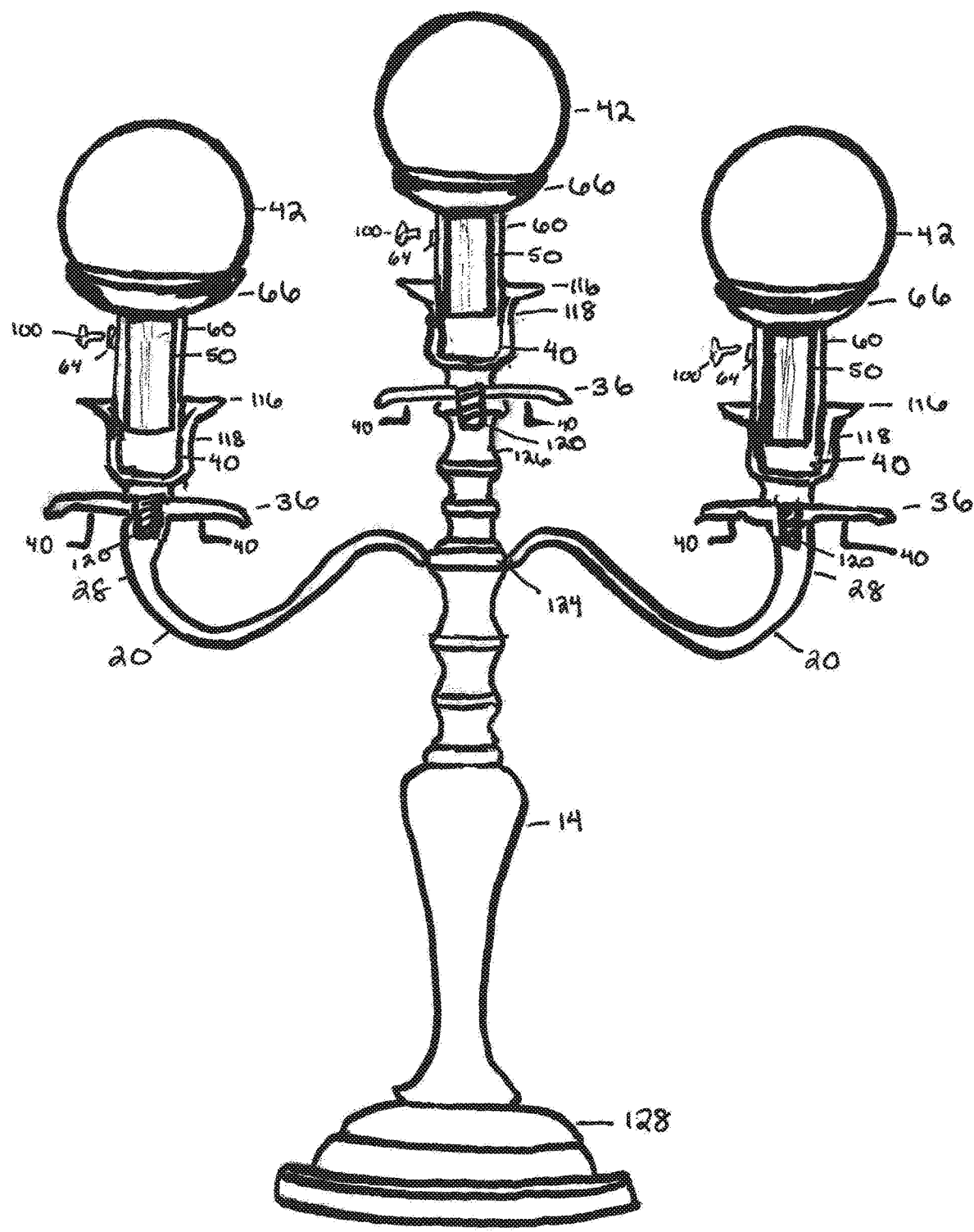
FIG. 20 is a front elevational sectional view illustrating solar light fixture constructed in accordance with the principles of the invention.

FIG. 20 comprises the invention in its assembled and ready-to-use state illustrating traditional candelabra and commonly used components of same, some of which have been improved upon in this invention. Improvements to invention described and illustrated may be applied to any candelabra or candlestick constructed to illuminate with candles, and apply to those with any number of arms 20 or capitals 102 with improvements made to each. Improvements to invention detailed in previous FIGS. 1, 3-19 may be applied to any candelabra or candlestick manufactured to illuminate with electricity or battery power with additional or modified improvements detailed further in FIGS. 21-30. Consideration should be given to ensure weight of solar light fixture in ready to use state substantial enough to withstand high winds, an improvement to invention. It is noted solar light fixture may be constructed combining several components pre-assembly; assembly from base 128 upwards and all variations thereof deemed appropriate. It is found candelabra and candlestick parts are generally interchangeable as many parts are of a standard measurement and components incorporated fully herein for purposes of this invention.

Components comprising solar light fixture illustrated described from top center downwards as: Rod tube 60 attached to capital 118 into which battery housing 50 of Petite size solar light bulb 42 inserted vertically. Capital 118, comprised of recessed inner well in which candle inserted and held vertically in place, generally ⅞" to 15/16" diameter× ⅝" to ¾" deep or thereabouts; capital screw 120 for its fastening to arm 20 or knop 126; and sconce 102 molded or attached to its top rim, now contains Petite size rod tube 60, 25/32"/2 cm outside diameter, inserted into inner well of capital 118, firmly attached utilizing methods as described in FIGS. 1 and 3. Large size rod tube 60, 15/16"/2.4 cm outer diameter generally found too wide to insert into capital 118, as is the Large size battery housing 50. Large size rod tube 60 attached or mounted to sconce 116 of capital 118 thereby affording generally ¾" open air space in inner well Capital 118, Large rod tube 60 height recommended minimum 1¾", length of battery housing 50, with additional height determined in relation to scale of finished solar light fixture, further described in FIGS. 4, 11, 17, 22, 24-27. Vertical side rod tube 60 may be fashioned with interior screw threads 64 matching thumb screw 100 to further secure battery housing 50 to rod tube 60 as described FIGS. 4, 7, 24, 27 and 29. Upper rim of rod tube 60 may be constructed with solar housing cup 66, an improvement to invention, similar to shape of candle cup 38, of approximate dimension of solar housing 46 with center opening width allowing passage of battery housing 50 into rod tube 60 as described in FIGS. 4, 7, 9 and 29.

Petite rod tube 60 illustrated here in FIG. 20 inserted into inner well of capital 118 approximately ¾" to 1". Rod tube 60 total length approximate minimum 2" tall ensures battery housing 50 does not rest on bottom capital 118. In event independent screw 122 and socket nut 56 or nipple 80 attaches capital 118 to solar light fixture, rod tube 60 height approximate minimum 2¼" recommended to ensure battery housing 50 does not rest on lowest inner well components of capital 118. As illustrated here, Petite size rod tube 60 diameter minutely smaller than inner well of capital 118. Drain holes 40 located horizontally at lowest level of capital 118 through and into rod tube 60. If capital 118 were larger overall diameter/dimension, drain holes 40 would be incorporated at lowest levels beneath inner rod tube 60 and capital 118.

Capital 118 may be newly constructed with attached rod tube 60 and incorporation of appropriate drain holes 40; of standard sizes of Petite and Large directly relating to size of battery housing 50 of solar light bulb 42; may contain additional decorative component mounted to sconce 116; molded as one component complementary to style of solar light fixture; and variations therein.

Bobeche 36 (aka drip pan) placed over center of knop 126 and arms 20. Capital screw 120 of attached capital 118 inserted down through bobeche 32 into interior screw threads 64 of knop 126 and arms 20 and securely fastened. Knop 126, with male screw 125 at its base, screws into interior screw threads 64 of shoulder 124 to which arms 20 are attached. Knop 126 may also be comprised of center opening for attachment via nipple 80 or combinations thereof. Shoulder 124 with interior screw threads 64, fastens to male screw 125 of column 14. Column 14 molded to base 128. Column 14 may be molded with male screw 125 at its top; or as found in some candlesticks and larger candelabras, interior screw threads 64 for attachment to, or center opening for passage of, nipple 80. All methods and variations of assembly and common and variable components incorporated herein to this invention, as all may be utilized with improvements to invention.

Arm 20 molded to shoulder 124. Center open hole 7 of bobeche 36 placed over center of outer arm 28. Capital screw 120 of attached capital 118 inserted over bobeche 36 into interior screw threads 64 of outer arm 28 and securely fastened. Battery housing 50 of solar light bulb 42 inserted vertically into rod tube 60 attached to capital 118.

Drain holes 40 incorporated in lowest level of capital 118 and rod tube 60 ensure drainage and air flow beneath battery housing 50 of solar light bulb 42. Drain holes 40 added to bobeche 36. As arms 20 and column 14 commonly found to be solid composition, drain holes 40 unnecessary. In the event arms 20 and column 14 hollow, drain holes 40 recommended at lowest levels arm 20 and under base 128.

Standard or traditional candelabra arms 20 commonly solid construction containing interior screw threads 64 molded into end of outer arm 28 for attachment of capital 118. Arms 20 are commonly found to be permanently affixed to shoulder 124, as illustrated here, or column 14, or as with large candelabras, attached to column 14 by screwing arm back 24 into column 14 or shoulder 124 and securely fastening with arm back nut 26. It is noted bobeche 36 and candle cup 38 currently found to be universally manufactured with center open hole 7.

Candelabras and candlesticks commonly utilize three methods of attachment of capital 118 to outer arm 28 or knop 126, including variations of those methods: (1) capital screw 120 molded to base of capital 118 secured into interior screw threads 64 of outer arm 28 or knop 126; (2) capital 118 does not contain capital screw 120 rather comprised of open center hole, which may or may not be comprised of interior screw threads 64, into which an independent screw 122, and may utilize lock washer 58, inserted into interior screw threads 64 of outer arm 28 or knop 126 to fasten capital 118; or (3) as found in certain candlesticks, capital 118 comprised of open center hole comprised of interior screw threads 64, fastened to nipple 80 as screwed into interior screw threads 64 in center hollow column 14. While previously listed methods commonly utilized in construction of candelabras and candlestick, all methods and variations of assembly and common and variable components incorporated herein to this invention, as all may be utilized with improvements to invention.

It is noted large candelabras may contain nipple 80 secured with socket nut 56 inside lower column 14 or shallow finial 34 secured to base 128 onto which components assembled and secured as generally described in FIG. 3. Knop 126 may be molded to shoulder 124, attached to nipple 80 vertically through center column 14 and secured at top with capital 118. All methods and variations of assembly and common variable components incorporated herein to this invention as all may be utilized with improvements to invention.

Figure 21:
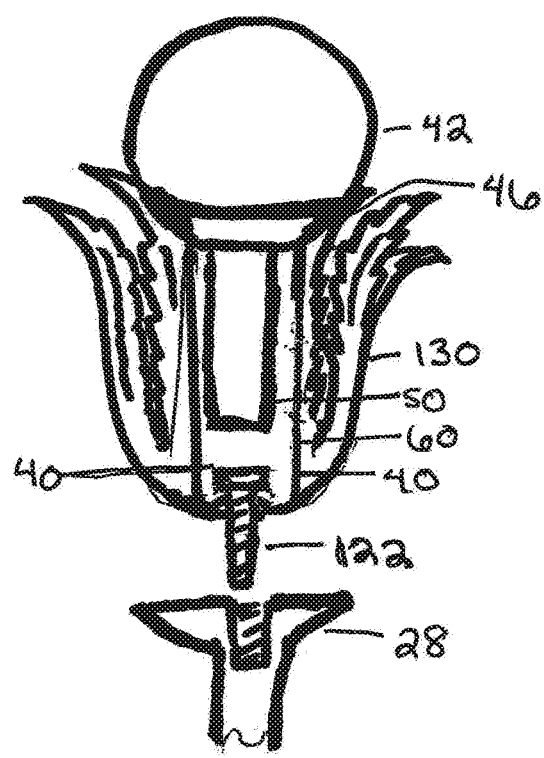
FIG. 21 is an exploded front elevational sectional view illustrating an improvement to invention and assembly of certain components of FIGS. 20, 22-23.

FIG. 21 illustrates sectional view of solar light fixture component replacing capital 118 with husk 130, an improvement of invention. Large size rod tube 60 attached to husk 130 into which battery housing 50 of Large size solar light bulb 42 inserted vertically. Husk 130, a currently manufactured chandelier component, found to be viable component to replace capital 118 as applied to candelabras and candlesticks. Traditional husk 130 design representing leaf fronds or wheat sheaves particularly appropriate in outdoor environment, its general height of 2⅜" and 2¾" diameter, ⅛ IP slip, and shape visually soften lineal shape of rod tube 60 and solar housing 46. Independent screw 122 fastens husk 130 to outer arm 28 or knop 126. Husk 130, rod tube 60 and capital screw 120 may be constructed as one unit, an improvement to invention. Drain holes 40 located horizontally at lowest level of husk 130 through and into rod tube 60. If outer arm 28 smaller overall diameter/dimension, drain holes 40 incorporated at lowest levels beneath inner rod tube 60 and husk 130. Alternative improvements to capital 118 include replacement with candle cup 38 and rod tube 60, other ornamental objects of similar size or complementary shape, miniature watering can, salt and pepper shakers resembling milk cans 168, with appropriate drain holes 40, presented as alternative examples, and further described as embellishments in FIG. 30, and not meant to be limited to those particular objects. Splash guard 72 may be added to improved candle cup 38 with rod tube 60 or alternative decorative improvement to invention.

Figure 22:
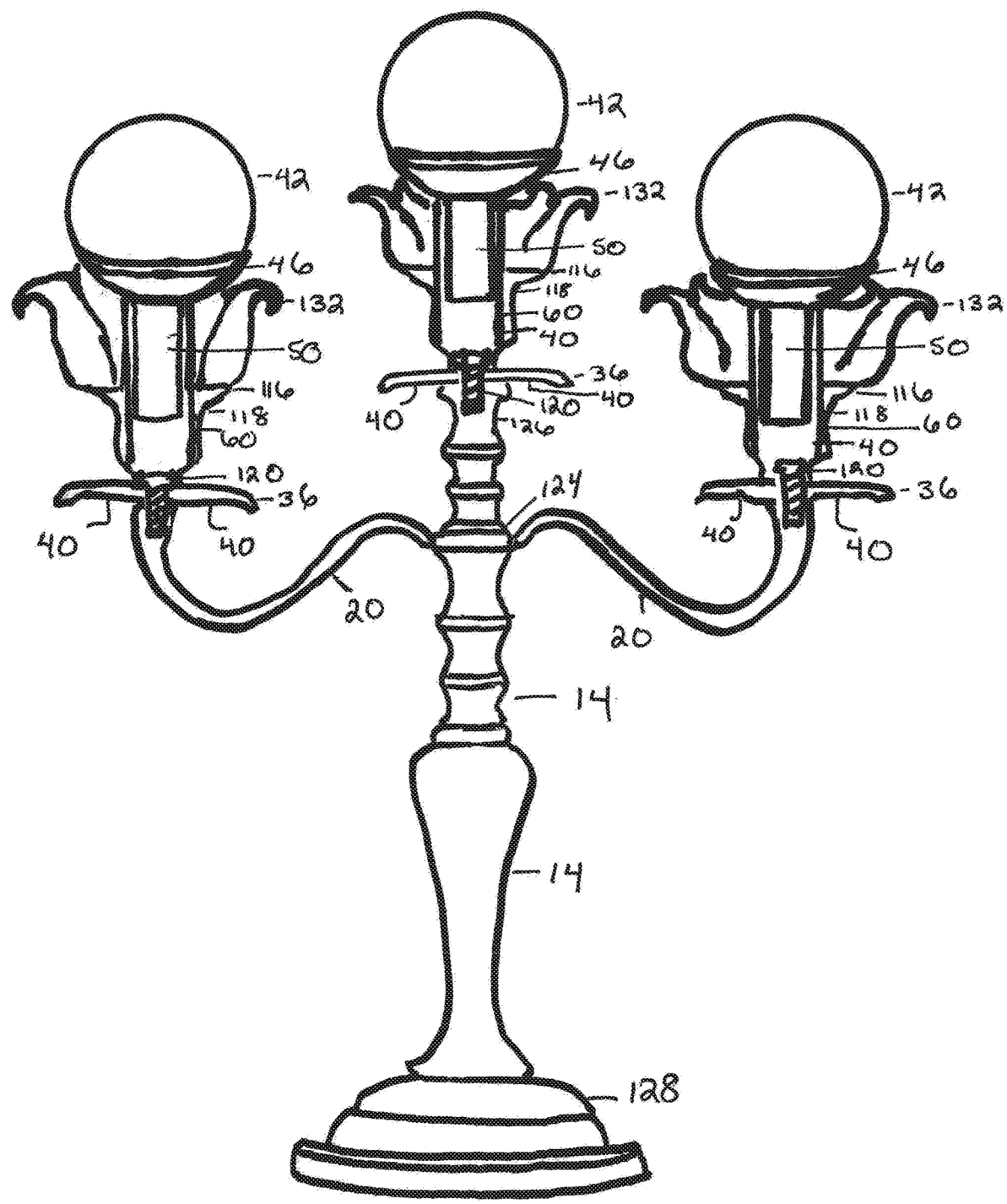
FIG. 22 is a front elevational sectional view illustrating solar light fixture constructed in accordance with the principles of the invention.

FIG. 22 illustrates alternative component to traditional capital 118 utilizing rain chain cup 132, currently manufactured and sold on retail market, an improvement of invention. Components comprising solar light fixture illustrated described from top center downwards as: Petite size rod tube 60 inserted approximately ¾" to 1" into inner well of capital 118 with molded capital screw 120 into which battery housing 50 of Petite size solar light bulb 42 inserted vertically. Rain chain cup 132, an improvement to invention, attached to sconce 116 of capital 118 to partially disguise rod tube 60 and solar housing 46 adding visual flourish to invention. Rain chain cup 132, currently manufactured in metal for outdoor use, generally comprised of open center hole approximately ⅞" diameter, flared upwards 2¼" and outwards to 3⅛" top opening, with exact measurements varying with manufacture, noting all size variances suitable options with appropriately applied improvements to invention. Rod tube 60 length approximate minimum 2" tall ensures battery housing 50 does not rest on bottom capital 118, with additional height determined in relation to rain chain cup 132 height. Rain chain cups 132 sold retail contain rings or chains molded to bottom hole rain chain cup 132 eliminated entirely for purposes of this invention. It is suggested rain chain cups 132 may be purchased wholesale in large quantities without the addition of chain or links.

Large size solar light bulb 42 may be utilized in invention by first mounting or attaching rain chain cup 132 to sconce 116 of capital 118. Large size rod tube 60 attached to lowest center rain chain cup 132 thereby affording generally ¾" open air space in inner well Capital 118. Large rod tube 60 height recommended minimum 1¾", length of battery housing 50, with additional height determined in relation to scale of rain chain cup 132 to finished solar light fixture, further described in FIGS. 4, 11, 17, 20, 24-27.

As illustrated in FIG. 20, as Petite size rod tube 60 diameter minutely smaller than inner well of capital 118, drain holes 40 located horizontally at lowest level of capital 118 through and into rod tube 60. If Large size rod tube 60 attached to sconce 116 of capital 118, drain holes 40 incorporated at lowest levels of capital 118 and lowest levels of rain chain cup 132 in sconce 116.

Capital 118 may be newly constructed with capital screw 120, rod tube 60, rain chain cup 132 to sconce 116 and appropriate drain holes 40, of standard sizes of Petite and Large directly relating to size of battery housing 50 of solar light bulb 42, molded as one component complementary to style of solar light fixture, and variations therein.

Bobeche 36 with drain holes 40 placed over center of knop 126 or outer arm 28. Capital screw 120 of capital 118 component with rain chain cup 132 inserted down through bobeche 32 into interior screw threads 64 of knop 126 or outer arm 28 and securely fastened. Knop 126, with male screw 125 at its base, screws into interior screw threads 64 of shoulder 124 to which arms 20 are attached. Shoulder 124 with interior screw threads 64, fastens to nipple 80 of column 14. Column 14 molded to base 128. As arms 20 and column 14 solid composition, drain holes 40 unnecessary. All methods and variations of assembly and common and variable components incorporated herein to this invention, as all may be utilized with improvements to invention.

Figure 23:
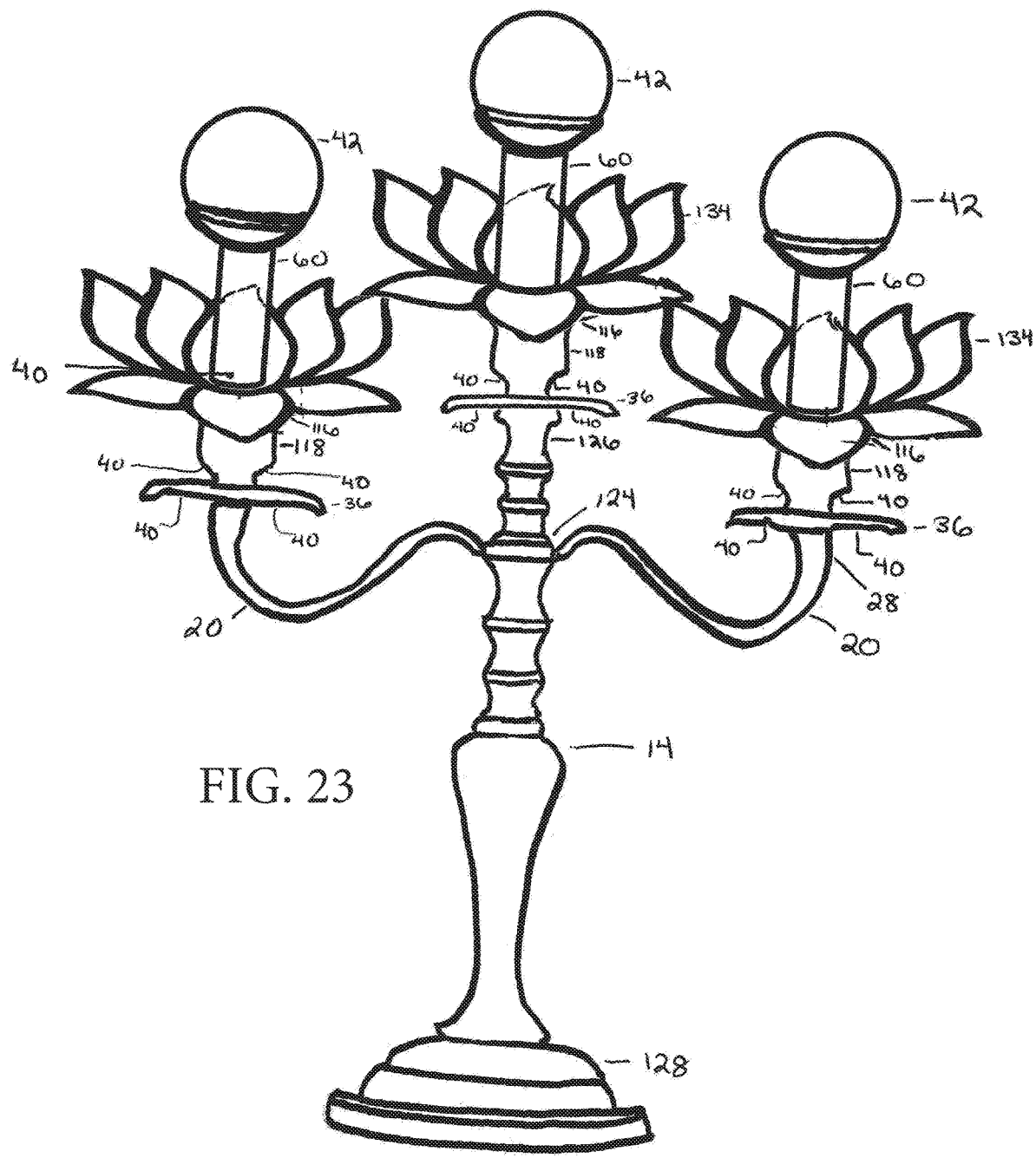
FIG. 23 is a front elevational sectional view illustrating solar light fixture constructed in accordance with the principles of the invention.

FIG. 23 illustrates alternative component to traditional capital 118 utilizing tea light holder 134 currently manufactured and sold on retail market for candle illumination, an improvement of invention. Decorative tea light holder 134 found to be viable component to enhance capital 118 as applied to candelabras and candlesticks. Tea light holder 134 design representing lotus flower particularly appropriate in outdoor environment, its general diameter of 4½" to 5" and interior depth of 1½" visually soften lineal shape of rod tube 60, enhancing visual effect of solar light fixture in outdoor environment, offered as example and incorporates any such design deemed appropriate to scale, size and style of particular solar light fixture. Tea light holder 134 incorporated with drain holes 40 below position of inner rod tube 60 as attached to center of tea light holder 134. Tea light holder 134 attached to sconce 116 of capital 118 containing capital screw 120. Rod tube 60, tea light holder 134, sconce 116, capital 118 and capital screw 120 may be constructed as one unit, an improvement to invention. Rod tube 60 attached to tea light candle holder 112 into which battery housing 50 of solar light bulb 42 inserted vertically. Drain holes 40 located at lowest level of capital 118. Drain holes 40 may be located horizontally at lowest level of rod tube 60. Method and components as described apply to both Large and Petite size solar light bulbs 42 and rod tubes 60 respectively, further described in FIGS. 4, 20-22, 24-30.

Capital 118 may be newly constructed with capital screw 120, rod tube 60, tea light holder 134 to sconce 116 and appropriate drain holes 40, of standard sizes of Petite and Large directly relating to size of battery housing 50 of solar light bulb 42, molded as one component complementary to style of solar light fixture, and variations therein.

Bobeche 36 with drain holes 40 placed over center of knop 126 or outer arm 28. Capital screw 120 of capital 118 component with tea light holder 134 inserted down through bobeche 32 into interior screw threads 64 of knop 126 or outer arm 28 and securely fastened. Knop 126, with male screw 125 at its base, screws into interior screw threads 64 of shoulder 124 to which arms 20 are attached. Shoulder 124 with interior screw threads 64, fastens to male screw 125 of column 14. Column 14 molded to base 128. As arms 20 and column 14 solid composition, drain holes 40 unnecessary. All methods and variations of assembly and common and variable components incorporated herein to this invention as all may be utilized with improvements to invention.

Figure 24:
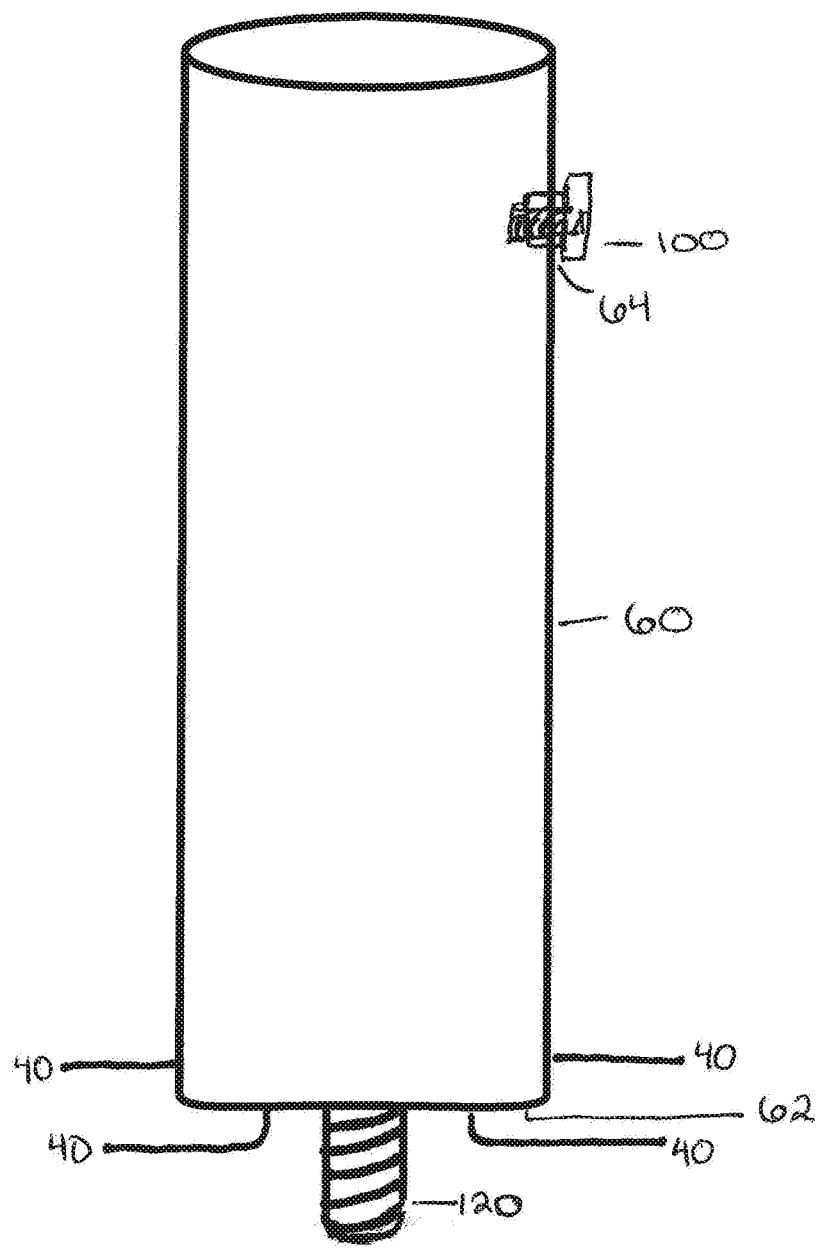
FIG. 24 is an exploded front elevational sectional view illustrating an improvement to invention of FIGS. 20, 22-23.

FIG. 24 illustrates an improvement to invention of constructing rod tube 60 with base plate 62 with capital screw 120 and containing drain holes 40. Capital screw 120 to base plate 62 of rod tube 60 fastens to interior screw threads 64 of outer arm 28 or knop 126. Drain holes 40 may be located horizontally at lowest level of side rod tube 60 and/or vertically in base plate 62. Vertical side rod tube 60 may be fashioned with interior screw threads 64 matching thumb screw 100 to further secure battery housing 50 to rod tube 60, as described in FIGS. 4, 7, 20, 27 and 29. Interior screw threads 64 should be located where thumb screw 100 may be accessed in fully assembled ready to use state. Thumb screw 100 may utilize wing nuts and/or be decorative in nature. This method provides for secure yet removable fit of solar light bulb 42 to solar light fixture, particularly useful in table top and portable solar light fixtures subjected to frequent handling, an improvement to invention. Rod tube 60 may be lineal or constructed in decorative form appropriate to solar light fixture style. Recommended minimum rod tube 60 height 2" allows ¼" open space between base 35 and battery housing 50 of inserted solar light bulb 42. Rod tube 60 may be constructed in resin antler horn or coral branch, resembling slender flower bud, crafted in style of candelabra or candlestick solar light fixture or otherwise not as pleasing adornment, presented as alternatives and not meant to be limited to those particular objects. Improvement may be used alone or with common candelabra and certain chandelier components such as bobeche 36, candle cup 38 and/or any decorative adornment to complement style of solar light fixture. Drain holes 40 of bobeche 36 or candle cup 38, if used, vertically in line with drain holes 40 of newly constructed base plate 62 to rod tube 60. This method provides simple assembly of rod tube 60 and optional accessories to outer arm 28 or knop 126 and drainage.

Figure 25:
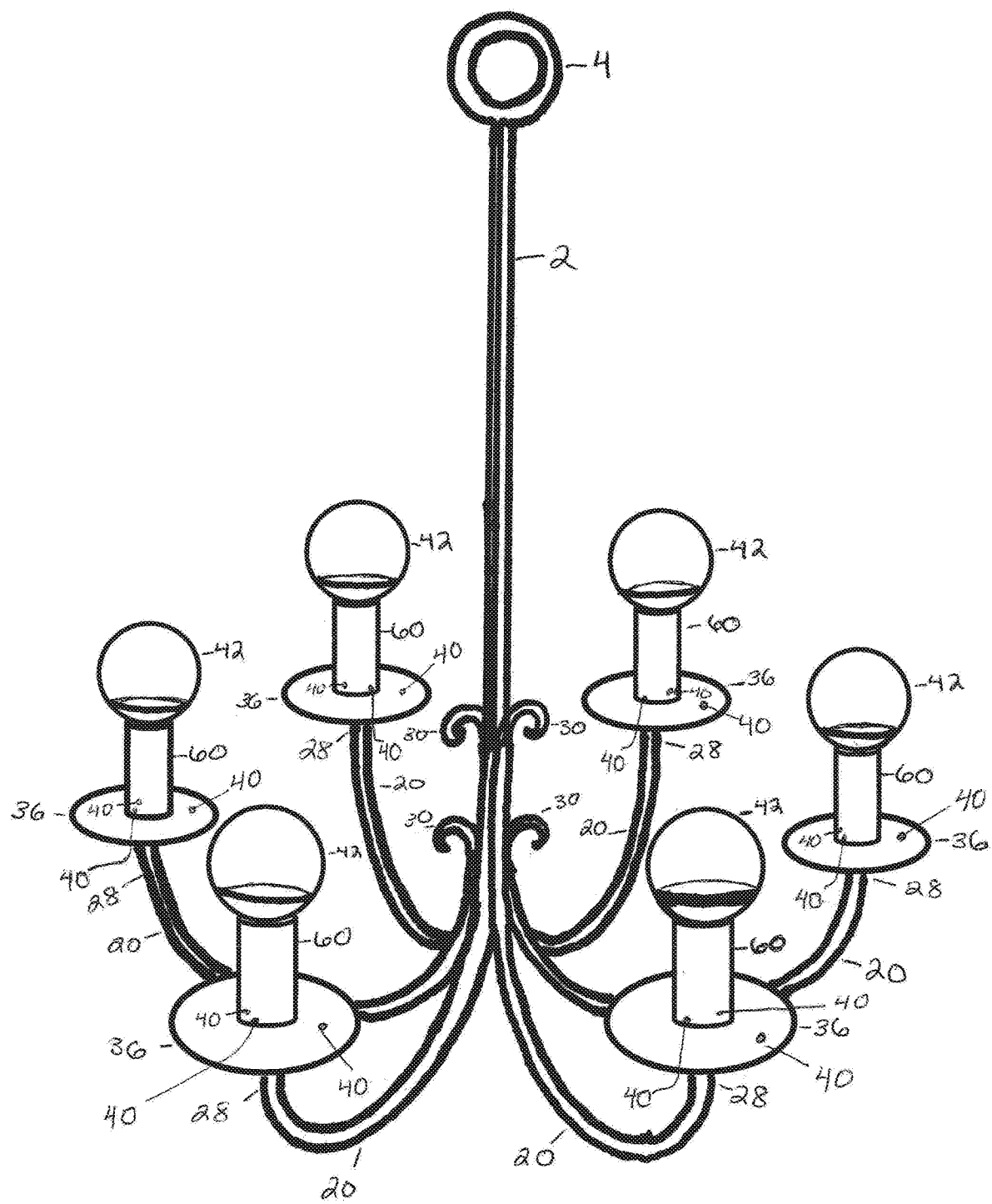
FIG. 25 is a front elevational view illustrating solar light fixture constructed in accordance with the principles of the invention.

FIG. 25 comprises the invention in its assembled and ready-to-use state utilizing candle chandelier currently manufactured and available on retail market, and commonly used components of same, some of which have been improved upon in this invention, and applies to any candle light fixture of similar composition or style with any number of arms 20 with improvements made to each.

Solar light fixture components illustrated are described from the top downwards as: Fixture hanger loop 4 molded onto solid body 2 comprised of scrolls 30 and arms 20. Swivel snap hook 110 attached to chain 106 with quick link 108, or variations as described FIGS. 1, 14-16 recommended for suspension purposes. Arms 20 comprised of solid metal extend outward from body 2. Bobeche 36 attached to outer arm 28. It is noted light fixtures constructed to hold block or utility type candles usually contain sharp spike 144 in top center of bobeche 36 into which candle is inserted. Spike 144 is eliminated from invention. Rod tube 60, minimum height of 2", attached to bobeche 36 by means of welding, adhesive or otherwise previously described in FIGS. 1, 3-6. Drain holes 40 may be incorporated in sides of rod tube 60 approximately ¼" above bobeche 36 and/or in bobeche 36 within inner position of rod tube 60. Drain holes 40 added to bobeche 36 outside of rod tube 60 location. Battery housing 50 of solar light bulb 42 inserted vertically into rod tube 60. This method allows for a secure yet removable fit of solar light bulb 42 to solar light fixture, air circulation and drainage. As body 2 and arms 20 of solid composition, drain holes 40 are not necessary in those components.

Figure 26:
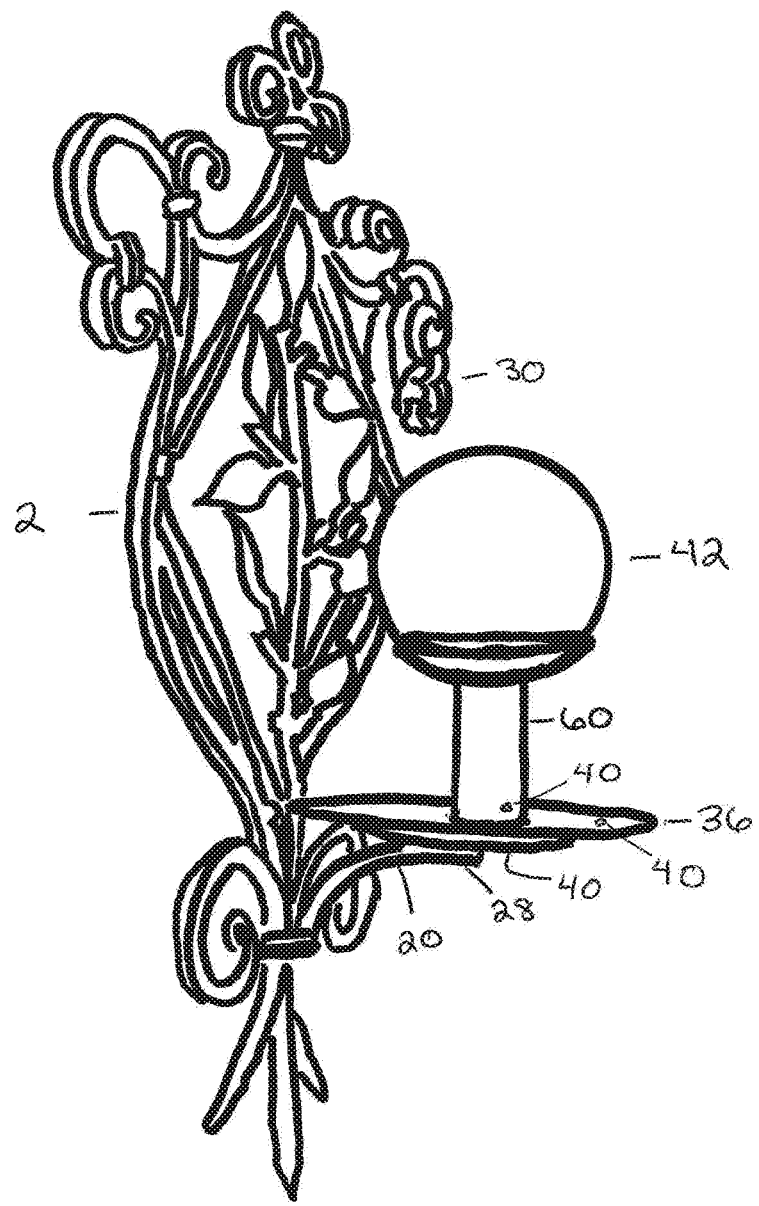
FIG. 26 is a front elevational view illustrating solar light fixture constructed in accordance with the principles of the invention.

FIG. 26 comprises the invention in its assembled and ready-to-use state utilizing candle wall sconce currently manufactured and available on retail market, and commonly used components of same, some of which have been improved upon in this invention, and applies to any candle light fixture of similar composition or style with any number of arms 20 with improvements made to each.

Solar light fixture components illustrated are described as: Solid body 2 comprised of scrolls 30 and decorative metal accents meant to hang or affix to vertical structure. Arm 20 comprised of solid metal extends outward from body 2. Bobeche 36 attached to outer arm 28. It is noted light fixtures constructed to hold block or utility type candles usually contain spike 144 in top center of bobeche 36 into which candle is inserted. Spike 144 is eliminated from invention. Rod tube 60, minimum height of 2", attached to center bobeche 36, by means of welding, adhesive or otherwise previously described in FIGS. 1, 3-6, 20-25 and 27. It is noted horizontal distance between center bobeche 36 to vertical body 2 must be of a depth such that solar light bulb 42 inserted into rod tube 60 may fit. Drain holes 40 may be incorporated in sides of rod tube 60 approximately ¼" above bobeche 36 and/or in bobeche 36 within inner position of rod tube 60. Drain holes 40 added to bobeche 36 outside of rod tube 60 location. Battery housing 50 of solar light bulb 42 inserted vertically into rod tube 60. This method allows for a secure yet removable fit of solar light bulb 42 to solar light fixture, air circulation and drainage. As body 2 and arms 20 of solid composition, drain holes 40 are not necessary in those components.

Figure 27:
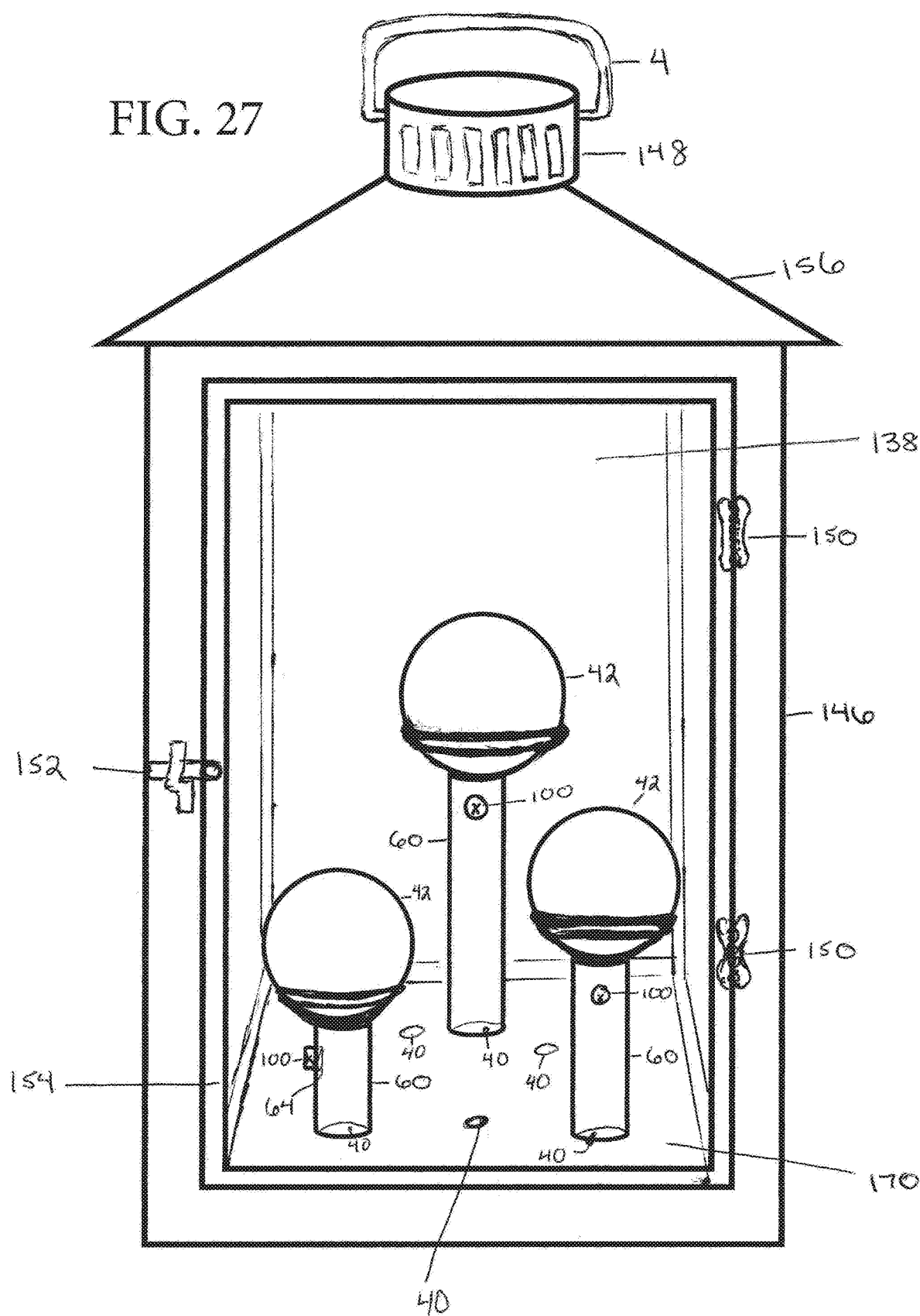
FIG. 27 is a front elevational view illustrating solar light fixture constructed in accordance with the principles of the invention.

FIG. 27 comprises the invention in its assembled and ready-to-use state utilizing candle lantern currently manufactured and available on retail market, and commonly used components of same, some of which have been improved upon in this invention, and applies to any candle lantern light fixture, described as a portable lighting device comprised of a metal box or cylinder with glass or mica side panels and an opening or ventilated cover on the top, protecting the candle wind to prevent flickering or complete extinguishment, as applies to all candle lanterns of similar composition or style or size of which made to contain any number of candles. An improvement to invention is to recommend glass panels 138 be of substantial thickness, utilize high quality, durable, scratch free clear or faceted plastic, Pyrex®, or other material suitable and appropriate for outdoor use in extreme conditions, encompassing combinations of or improved variations to this invention.

Solar light fixture components illustrated are described as: Body 2 comprised of a metal box 146 with attached base plate 62 and hood 156. Fixture hanger loop 4 attached to top vent 148 attached to top hood 156 allowing heat to escape. Glass panels 138 fit within sides of metal box 146, one of which fitted with hinges 150 and latch mechanism 152 to act as lantern door 154 allowing access to interior of body 2. Spike 144, if incorporated into base plate 62 onto which candle is inserted, is eliminated from invention and is an improvement to invention. Rod tube 60, minimum height of 2", attached to lantern base 170 by means of welding, adhesive or otherwise previously described in FIGS. 1, 3-6, 20-26. Several rod tubes 60 of varying heights may be incorporated into solar light fixture largely determined by width and height of solar light fixture. Rod tube 60 incorporates interior screw threads 64 with thumb screw 100 holding solar light bulb 42 securely in this portable solar light fixture. As hood 156 usually of solid material blocking overhead sunlight, consideration must be given to height of solar light bulb 42 in relation to ability to receive sunlight as positioned in rod tube 60 and recommended in lantern base 170. Glass panels 138 allow passage of sunlight to solar light bulb 42 and, as their reflection magnifies power or strength of sun, compensates for lack of direct overhead sun as blocked by hood 156. Drain holes 40 incorporated in lantern base 170 below inner position of rod tube 60. Battery housing 50 of solar light bulb 42 inserted vertically into rod tube 60. This method allows for a secure yet removable fit of solar light bulb 42 to solar light fixture, air circulation and drainage and a portable solar light fixture which may be placed on flat surface or suspended.

FIG. 28 illustrates an improvement and sample method of said improvement of invention depicting the addition of exterior paint/finish or specialty coating 156, referencing clear coats and color, to the solar housing 46 of solar light bulb 42 to complement or match color and/or finish of solar light fixture. Solar light bulbs 42 currently available as Large solar housing 46 dark bronze or silver color. Petite solar housing 46 predominantly available as matte black. Where an exterior finish complementary to solar light fixture exterior color already incorporated into specifications of solar housing 46 as manufactured or in production, addition of exterior paint/finish or specialty coating 156 will not be necessary. It is noted that to match or complement solar housing 46 to solar light fixture, and especially to rod tube 60, results in an overall appearance of higher quality and cohesiveness. It is noted rod tube 60, or its upper portion, may match standard Large dark bronze or silver, or Petite black, solar housing 46 currently manufactured with base of rod tube 60 color blending into its next joined component, combinations of which described further in FIG. 29. Exterior paint/finish or specialty coating 156 may be applied to solar housing 46 and rod tube 60 such in the case of brass or gold may be applied to solar housing 46 and rod tube 60 for use in brass solar light fixture; silver to Petite solar housing 46 and rod tube 60 for use in black or silver solar light fixture; color or finish to match or complement, and encompassing all colors, decorative designs, embellishments and combinations further described in FIGS. 29-30, an improvement to invention. Spray paint can 158 illustrated meant to encompass all variations of application and manufacturing methods, including powder coating, baking, dipping, molding, etc. of an exterior paint/finish or specialty coating 156 thereof in pre- or post-production to solar housing 46.

FIG. 29 illustrates an improvement and sample method of said improvement to invention depicting addition of exterior paint/finish or specialty coating 156 to all components of solar light fixture, including rod tube 60 and its solar housing cup 66 and thumb screw 36 if incorporated. Spray paint can 158 illustrated meant to encompass all variations of application and manufacturing methods, including powder coating, baking, dipping, molding, etc. of exterior paint/finish or specialty coating 156 thereof in pre- or post-production. It is noted that standard colors and in many cases finishes currently offered in traditional light fixtures are pleasing and durable in outdoor environments. Exterior paint/finish or specialty coating 156 may be representative of a recommended exterior clear coat applied to silver, chrome, brass or metallic solar light fixture components to retain their brilliance outdoors, and/or as protective coating generally. It is noted that vivid colors of hot pink or fuchsia, bright blue, metallic, gold, chrome, silvers, greens and reds especially pleasing outdoors in all climates and regions of world, those and more which may be considered as applied to solar light fixture, an improvement to invention.

It is recommended exterior paint/finish or specialty coating 156 applied to interior of hollow solar light fixture components in which drain holes 40 incorporated such as arm 20, arm body 18, ball fount 32, finial 34, and any additional components as applicable to gravitational interior drainage which lead to drain holes 40, recommended to be of rust preventative or clear finish and may incorporate color. It is noted glass sconce 98 and glass panels 138 will not require exterior paint/finish or specialty coating 156 but may benefit from artful application taking into consideration amount of sun or daylight solar light bulb 42 will receive as such encased.

As noted in FIG. 28, to match or complement solar housing 46 to solar light fixture, and especially to rod tube 60, results in an overall appearance of higher quality and cohesiveness. It is noted rod tube 60, or its upper portion, may match standard dark bronze, silver or black solar housing 46, as currently manufactured, with base of rod tube 60 color blending into its next joined component such as candle wax drips or shading if different. Interior only of candle cup 38, bobeche 36, husk 130, rain chain cup 132, tea light holder 134, may be treated with exterior paint/finish or specialty coating 156 to match rod tube 60, as matched to standard solar housing 46 currently manufactured, with outer and/or underneath surfaces complementing or matching remaining solar light fixture components, a myriad of possible combinations incorporated herein as an improvement to invention.

Exterior paint/finish or specialty coating 156 may be applied to rod tube 60 and solar housing cup 66 to match or complement solar light fixture wherein currently manufactured solar light bulb 42 may be used with its solar housing 46 unseen. Method eliminates need to apply exterior paint/finish or specialty coating 156 to solar housing 46; solar light bulbs 42 may continue to be manufactured in existing colors and materials.

Components benefiting from exterior paint/finish or specialty coating 156 illustrated as: chain 106, quick link 108, swivel snap hook 110, fixture hanger loop 4, plug or top screw 6, crown bobeche 8, check ring 10, reducer neck 12, column 14, break neck 16, arm 20 incorporating arm body 18, arm back 24 outer arm 28 and scroll 30, rod tube 60, ball fount 32, finial 34, bobeche 36 or candle cup 38, back plate 90, splash guard 72 not shown, sconce 116, capital 118, shoulder 124, knop 126, base 128, hood 156, post cap 142, metal box 146, lantern base 170 with drain holes 40, vent 148, hinges 150 and latch mechanism 152, as described and illustrated in FIGS. 1, 16, 18, 22, 25, 26. Components illustrated meant as representation of all applicable parts which may be utilized in solar light fixture as exposed and vulnerable to outdoor elements, not limited to those listed above.

FIG. 30 representative of embellishments constructed, or as improved, to withstand outdoor conditions that may be added to enhance overall appearance of solar light fixture. Materials may include any deemed rated for outdoor use and it is noted exterior paint/finish or specialty coating 156 may be applied to render particular embellishment resilient to outdoor conditions. Birds nest 160 may be fashioned so as to surround rod tube 60 attached to sconce 116 of capital 118 or bobeche 36 with solar light bulb 42 emerging from center, essentially an improved candle cup 38, especially attractive on candlestick style solar light fixture; large birds nest 160 of pliable plastic or metal attached under or around ball fount 32 of chandelier style solar light fixture nestled amongst arms 20 results in appearance of chandelier nestled in birds nest; candle ring 162 sized to be slipped over and surround base rod tube 60 resting on bobeche 36 comprised of fronds of high quality plastic, crystal or glass beads attached to stainless or exterior wire extending outwards and around solar light bulb 42; sprigs of brass, copper or metal hammered leaves or flowers twisted into candle ring 162 for rod tube 60 or directly attached to certain components of solar light fixture. Embellishments may include a decorative cage 136 such as found on electric utility lights may be added to solar light fixture; chandelier drops or prisms; decorative chains of crystals, sea glass, seashells, pearls, chain may adorn solar light fixture; rhinestone wraps 148 also sold as rhinestone ribbon may be wrapped around rod tube 60 and suggest silver rhinestone wrap 164 particularly elegant on all black solar light fixture with silver solar housing 46. Additional rhinestone chains or adornments may be added as aesthetically appropriate. Rod tube 60 may be adorned with newly manufactured to size candle cover 68 as described in FIGS. 4 and 11, embellished to resemble dripping candle or otherwise appropriate rendition appropriate to style of solar light fixture, an improvement to invention.

Rod tube 60 or candle cover 68 may be constructed in resin or outdoor material representing antler horn, coral branch, faux wood branch, spray of seashells, as described in FIG. 24, crafted to style of solar light fixture and may be considered an embellishment. Capital 118 or candle cup 38 may be replaced with ornamental objects of similar size or complementary shape, miniature watering can 166, salt and pepper shakers resembling milk cans 168, rain chain cup 132, decorative husk 108, lotus flower petals, as described in FIGS. 4, 21, 24 and 28, with appropriate drain holes 40, presented as representative examples and not meant to be limited to those particular objects, considered embellishments, an improvement to invention.

Figure 31:
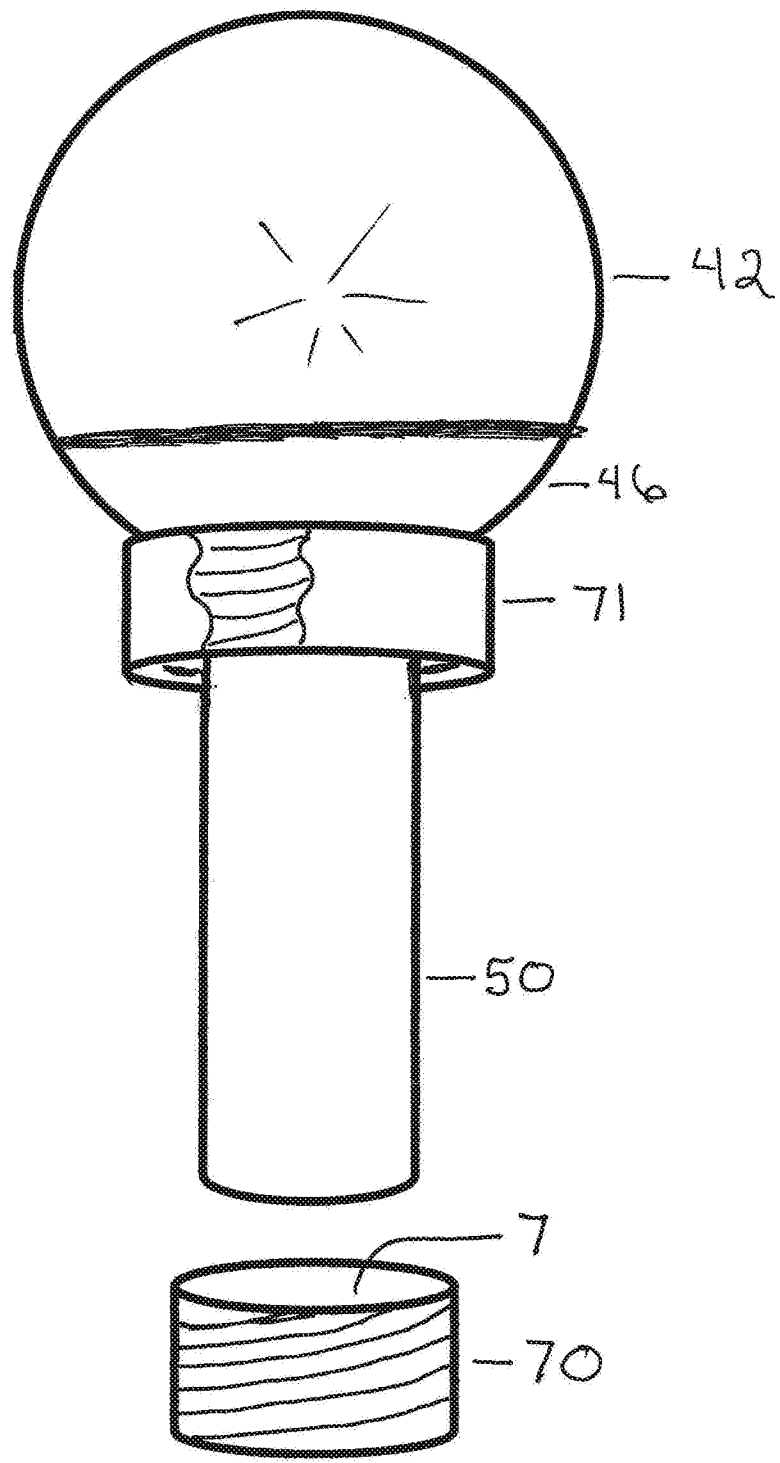
FIG. 31 is a side elevational view illustrating sample improvements to invention and method of improvement.
Figure 32:
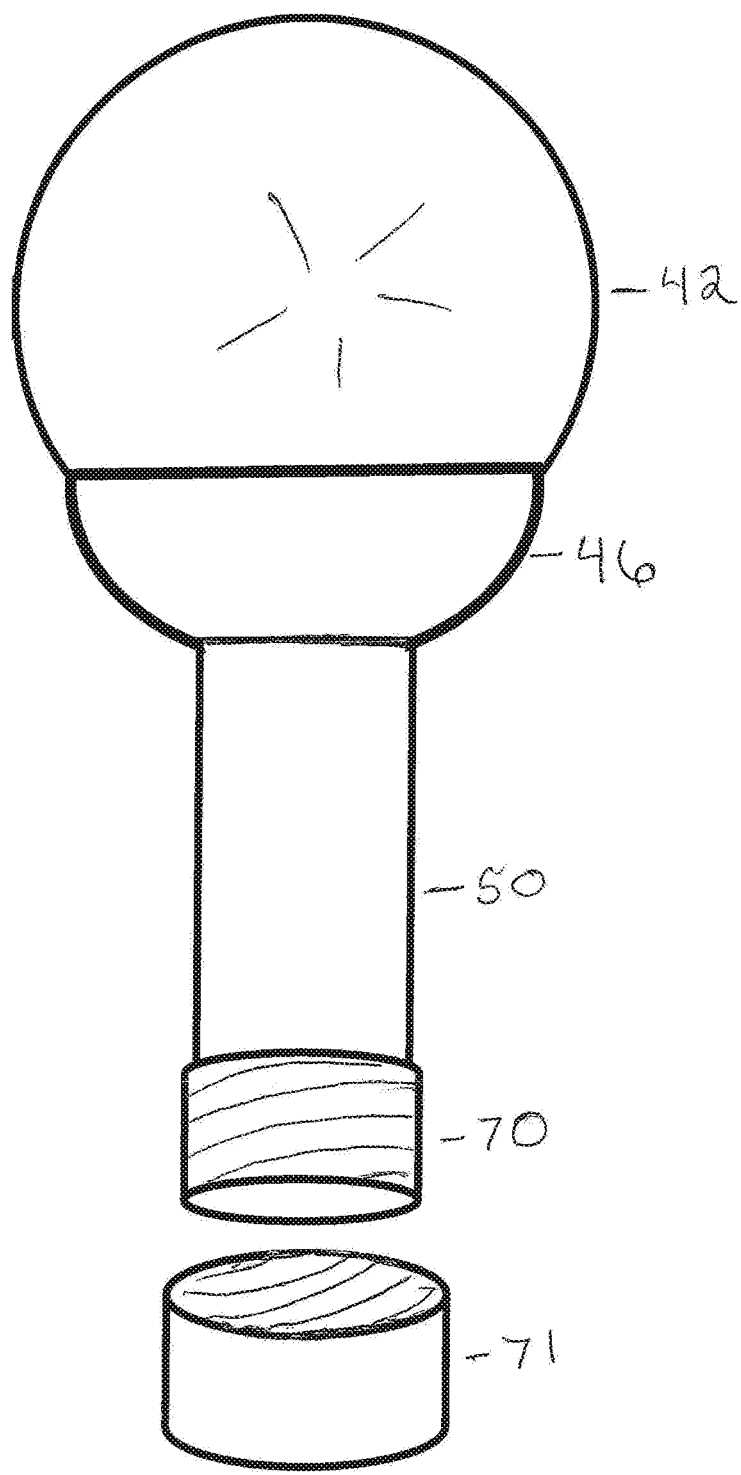
FIG. 32 is a side elevation view illustrating sample improvements to invention and method of improvement.
Figure 33:
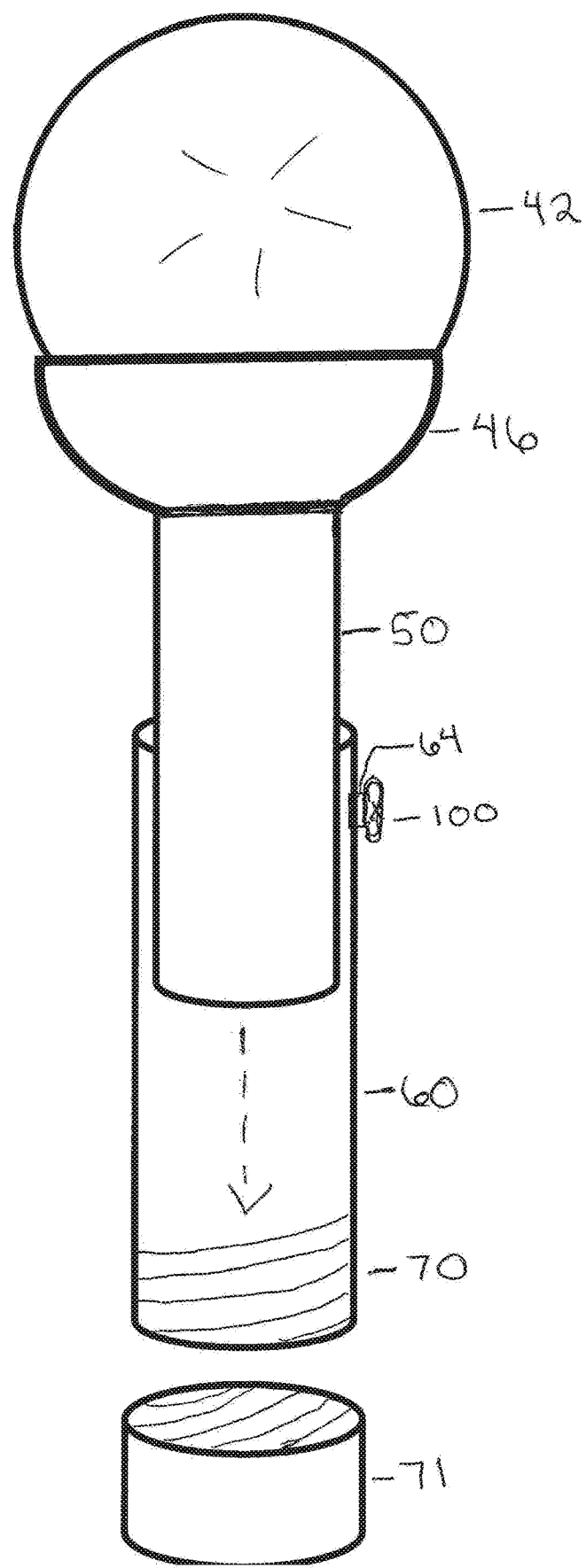
FIG. 33 is a side elevation and a partial cross-sectional view illustrating sample improvements to invention and method of improvement.

FIG. 31 illustrates an improvement to invention which fastens or constructs female screw threads 71 to solar housing 46 of solar light bulb 42 corresponding to male screw threads 70 attached to solar light fixture. Male screw threads 70 and corresponding female screw threads 71 commonly manufactured in several uniform sizes as PVC Hub and Trap Adapters traditionally used for plumbing purposes are cited as example, modifications of which also incorporated as improvement to invention. Male screw threads 70 attached over center open hole 7 to any object of circumference and depth to accommodate insertion of battery housing 50. Center open hole 7 of solar light fixture may be incorporated, modified or manufactured for this purpose. Female screw threads 71 attached to outer lower solar housing 46. Battery housing 50 of solar light bulb 40 with female screw threads 71 attached to solar housing 46 inserted into center open hole 7 of male screw threads 70 and screwed clockwise into place. Solar light fixture firmly holds solar light bulb 42 at any angle while providing access to battery housing 50 for purposes of changing rechargeable battery 48.

While the foregoing written description of the invention enables one of ordinary skill to make and use what is considered presently to be the best mode thereof, those of ordinary skill will understand and appreciate the existence of variations, combinations and equivalents of the specific embodiment, method and examples herein. The invention should therefore not be limited by the above described embodiment, method and examples, but by all embodiments and methods within the scope and spirit of the invention as claimed.

The invention claimed is:

1. A system for converting a lighting fixture to a solar light lantern comprising:
    a rod tube and a solar light fixture;
    the rod tube having a first end and a second end, wherein the first end of the rod tube has an opening to a hollow interior of the rod tube and the second end of the rod tube has a screw thread that is capable of removably coupling the rod tube to the lighting fixture;
        the solar light fixture having a solar light bulb and a housing extending from the solar light bulb;
        wherein the solar light fixture further comprises one or more solar cells;
        wherein the solar light fixture further comprises a rechargeable battery enclosed within the housing of the solar light fixture;
        wherein the rechargeable battery is charged by the one or more solar cells;
        wherein the solar light bulb is powered by the solar cells or the rechargeable battery;
        wherein the housing of the solar light fixture is removably insertable into the hollow interior of the rod tube, such that the solar light fixture is supported by the rod tube when the screw thread of the rod tube is coupled to the lighting fixture; and
    wherein a thumb screw is removably insertable into a second screw thread extending through the rod tube, such that the thumb screw abuts against the housing of the solar light fixture to further secure the solar light fixture when inserted into the hollow interior of the rod tube.

2. The system of claim 1, wherein the rod tube has at least one drainage hole.

3. The system of claim 2, wherein the drainage hole is located at the gravitational bottom of the rod tube.

4. The system of claim 2, wherein the drainage hole is located on the second end of the rod tube adjacent to the screw thread.

5. The system of claim 1, wherein the screw thread is a female screw thread.

6. The system of claim 1, wherein the screw thread is a male screw thread.

7. The system of claim 1, wherein the second end of the rod tube is coupled to one of a candle cup, a bobeche, or a husk.

8. A system for converting a lighting fixture to a solar light lantern comprising:
 a rod tube and a solar light fixture;
 the rod tube having a first end and a second end, wherein the first end of the rod tube has an opening to a hollow interior of the rod tube and the second end of the rod tube is capable of being mechanically coupled to the lighting fixture;
 the solar light fixture having a solar light bulb and a housing extending from the solar light bulb;
 wherein the solar light fixture further comprises one or more solar cells;
 wherein the solar light fixture further comprises a rechargeable battery enclosed within the housing of the solar light fixture;
 wherein the rechargeable battery is charged by the one or more solar cells;
 wherein the solar light bulb is powered by the solar cells or the rechargeable battery;
 wherein the housing of the solar light fixture is removably insertable into the hollow interior of the rod tube, such that the solar light fixture is supported by the rod tube when the second end of the rod tube is mechanically coupled to the lighting fixture; and
 wherein a thumb screw is removably insertable into a second screw thread extending through the rod tube, such that the thumb screw abuts against the housing of the solar light fixture to further secure the solar light fixture when inserted into the hollow interior of the rod tube.

9. The system of claim 8, wherein the second end is mechanically coupled to the lighting fixture by welding, gluing, or molding.

* * * * *